US010565297B2

(12) United States Patent
Keslin et al.

(10) Patent No.: US 10,565,297 B2
(45) Date of Patent: Feb. 18, 2020

(54) RUMORED CHANGES FOR REAL-TIME COAUTHORING

(71) Applicant: Microsoft Technology Licensing, LLC., Redmond, WA (US)

(72) Inventors: Michelle Elena Keslin, Kirkland, WA (US); Jitesh Sachdeva, Bellevue, WA (US); Ali Taleghani, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 457 days.

(21) Appl. No.: 14/751,611

(22) Filed: Jun. 26, 2015

(65) Prior Publication Data

US 2016/0378737 A1 Dec. 29, 2016

(51) Int. Cl.
*G06F 17/24* (2006.01)
*H04L 29/08* (2006.01)
(Continued)

(52) U.S. Cl.
CPC ............ *G06F 17/24* (2013.01); *G06F 3/1415* (2013.01); *G06F 17/218* (2013.01);
(Continued)

(58) Field of Classification Search
CPC .... G06F 17/218; G06F 17/2288; G06F 17/24; G06F 17/243; G06F 17/246;
(Continued)

(56) References Cited

U.S. PATENT DOCUMENTS

| 5,515,491 A | 5/1996 | Bates et al. |
| 7,941,399 B2 | 5/2011 | Bailor et al. |

(Continued)

FOREIGN PATENT DOCUMENTS

| GB | 2518244 A | 3/2015 |
| WO | 2007062949 A1 | 6/2007 |

OTHER PUBLICATIONS

Ehrlich, Brenna, "Google Docs Emulates Microsoft Word's "Track Changes" Feature", Published on: Sep. 30, 2010 Available at: http://mashable.com/2010/09/30/google-docs-track-changes/.
(Continued)

*Primary Examiner* — Tan H Tran
(74) *Attorney, Agent, or Firm* — Merchant & Gould P.C.

(57) ABSTRACT

Systems and methods for enabling the real-time sharing of document edits as rumored changes are disclosed herein. As an editor makes changes to a document being coauthored, those edits may be entered into the editor's copy as concrete changes that are incorporated into the copy's backing store, and may be shared as rumored changes to endpoints that are not incorporated into their backing stores. Rumored changes display the endpoint's real-time interpretation of an edit made by an editor, but are not incorporated as concrete changes until a save command occurs. By enabling the real-time display of edits as rumored changes, editing users can make edits naturally and endpoint users can see those edits being made with a reduced chance of corruption on the endpoint and lower network overhead and processing by the computing devices involved in the coauthoring environment.

13 Claims, 15 Drawing Sheets

(51) Int. Cl.
*G06F 17/21* (2006.01)
*G06F 17/22* (2006.01)
*G06F 3/14* (2006.01)
*G06Q 10/10* (2012.01)
*H04L 12/18* (2006.01)

(52) U.S. Cl.
CPC ........ *G06F 17/2288* (2013.01); *G06F 17/243* (2013.01); *G06F 17/246* (2013.01); *G06Q 10/10* (2013.01); *G06Q 10/101* (2013.01); *H04L 12/1822* (2013.01); *H04L 67/06* (2013.01)

(58) Field of Classification Search
CPC ... G06F 3/1415; H04L 67/06; H04L 12/1822; G06Q 10/10; G06Q 10/101
See application file for complete search history.

(56) References Cited

U.S. PATENT DOCUMENTS

| | | | |
|---|---|---|---|
| 8,108,779 B1* | 1/2012 | Rein | G06F 17/30017 715/733 |
| 8,434,002 B1 | 4/2013 | Shah et al. | |
| 8,739,021 B2 | 5/2014 | Yuniardi | |
| 9,817,805 B1* | 11/2017 | Markman | G06F 17/241 |
| 2004/0085354 A1 | 5/2004 | Massand | |
| 2009/0249224 A1 | 10/2009 | Davis et al. | |
| 2010/0281007 A1* | 11/2010 | Bailor | G06F 17/30011 707/704 |
| 2011/0252339 A1 | 10/2011 | Lemonik et al. | |
| 2012/0110445 A1* | 5/2012 | Greenspan | G06F 17/24 715/256 |
| 2012/0233543 A1 | 9/2012 | Vagell et al. | |
| 2012/0278401 A1 | 11/2012 | Meisels et al. | |
| 2013/0155071 A1 | 6/2013 | Chan et al. | |
| 2013/0160142 A1* | 6/2013 | Lai | G06F 21/6209 726/28 |
| 2013/0191451 A1* | 7/2013 | Tse | G06Q 10/101 709/204 |
| 2013/0262373 A1 | 10/2013 | Rampson | |
| 2013/0283147 A1 | 10/2013 | Wong et al. | |
| 2014/0129645 A1* | 5/2014 | Mo | G06F 17/2229 709/205 |
| 2014/0149857 A1 | 5/2014 | Vagell et al. | |
| 2015/0052427 A1 | 2/2015 | Vagell et al. | |

OTHER PUBLICATIONS

Arar, Yardena, "Collaboration in Microsoft Office: Painful but not Impossible", Published on: Apr. 9, 2013 Available at: http://www.pcworld.com/article/2033437/collaboration-in-microsoft-office-painful-but-not-impossible.html.

"Google Sheets—Create and Edit Spreadsheets Online, for Free", Published on: Jul. 1, 2014 Available at: http://www.google.co.in/sheets/about/.

"Collaborative Revision with Google Docs", Retrieved on: Apr. 10, 2015 Available at: http://static.googleusercontent.com/media/www.google.com/en//educators/learning_materials/WR_revisingguide.pdf.

Niaulin, Benjamin, "Co-Authoring Documents with SharePoint 2013", Published on: Jul. 29, 2013 Available at: http://en.share-gate.com/blog/co-authoring-documents-sharepoint-2013.

Lin, et al., "CCDES—A Collaborative Compound Document Editing System", In Journal of Computer Communications, vol. 19, Issue 6-7, Jun. 1, 1996, pp. 590-596.

"International Search Report and Written Opinion Issued in PCT Application No. PCT/US2016/039123", dated Sep. 2, 2016, 13 Pages.

* cited by examiner

RUMORED CHANGES FOR REAL-TIME COAUTHORING

BACKGROUND

Coauthoring documents, where several authors make changes to a document, enables users to collaborate in the creation and editing of documents. Coauthors, however, when making edits in real-time may make edits that conflict with one another's edits, which can cause aberrant behavior in the document. This aberrant behavior, if unaddressed, may cause the document to be corrupted, and, if addressed improperly, may cause frustration for coauthors as a real-time coauthoring may be degraded.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods for enabling rumored changes for real-time coauthoring are disclosed herein. In a coauthoring environment, edits to a document may be shared between an editor and an endpoint. An editor may be a software application or device at which an edit to a document originates, and an endpoint may be a software application or device to which the edit is transmitted for display or incorporation. As will be understood, multiple editors and endpoints may simultaneously transmit and receive edits to a given document, and a given software application or device may simultaneously be an editor and an endpoint within a coauthoring environment. The systems and methods described herein may be incorporated into the editors, the endpoints, both the editors and endpoints, or may be provided as a server-based service to the coauthors.

When an edit is made by the editor, the document displayed on the endpoint may be updated to include the edit. The edit may implemented differently by the editor and by the endpoint so that the edit can be displayed in real-time on both the editor and the endpoint without causing aberrant behavior on the endpoint. One such method to enable real-time coauthoring is for the edit to be implemented as a concrete change on the editor, where the edit originates, and as a rumored change on the endpoint, with which the edit is shared. Concrete changes are those edits that are fully incorporated into a document's backing store, whereas rumored changes are those edits that are displayed in the document being coauthored, but not fully incorporated into the document's backing store.

An edit represented by a rumored change received as part of a real-time update may be incorporated as a concrete change when a save command occurs and initiates a non-real-time update. A save command provides the endpoint additional time to process the edit made by the editor so that aberrant behavior is not introduced when the edit is incorporated. As will be understood, because a rumored change may contain edits that would have introduced aberrant behavior on the endpoint if implemented in real-time, when it is incorporated in response to a save command, the concrete change may differ from the rumored change to properly reflect the edit based on the editor's understanding of the document being coauthored.

By enabling endpoints to coauthor in real-time by using rumored changes from editors, an improved user experience is provided; users of applications or devices that could not otherwise concurrently coauthor a document in real-time are enabled to see edits made by coauthors with a reduced risk of corruption to the document. Additionally, the functionalities of a network or a coauthoring application or device are improved by reducing the risk of document corruption and reducing the need to perform merge-updates to synchronize documents while being coauthored. Therefore, a computer using the present disclosure may improve the functioning of the computer itself or effect an improvement in a network or another computer.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1A:
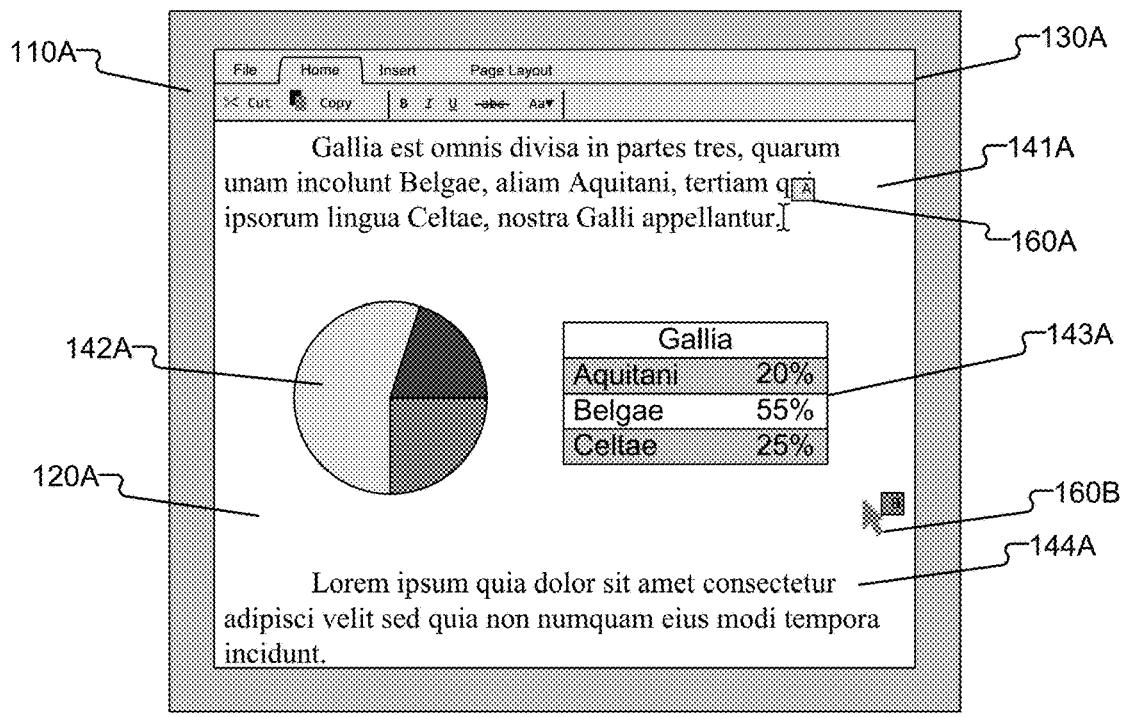
FIGS. 1A-H illustrate an example coauthoring environment in which various edits are made to a document in accordance with the present disclosure.
Figure 1A:
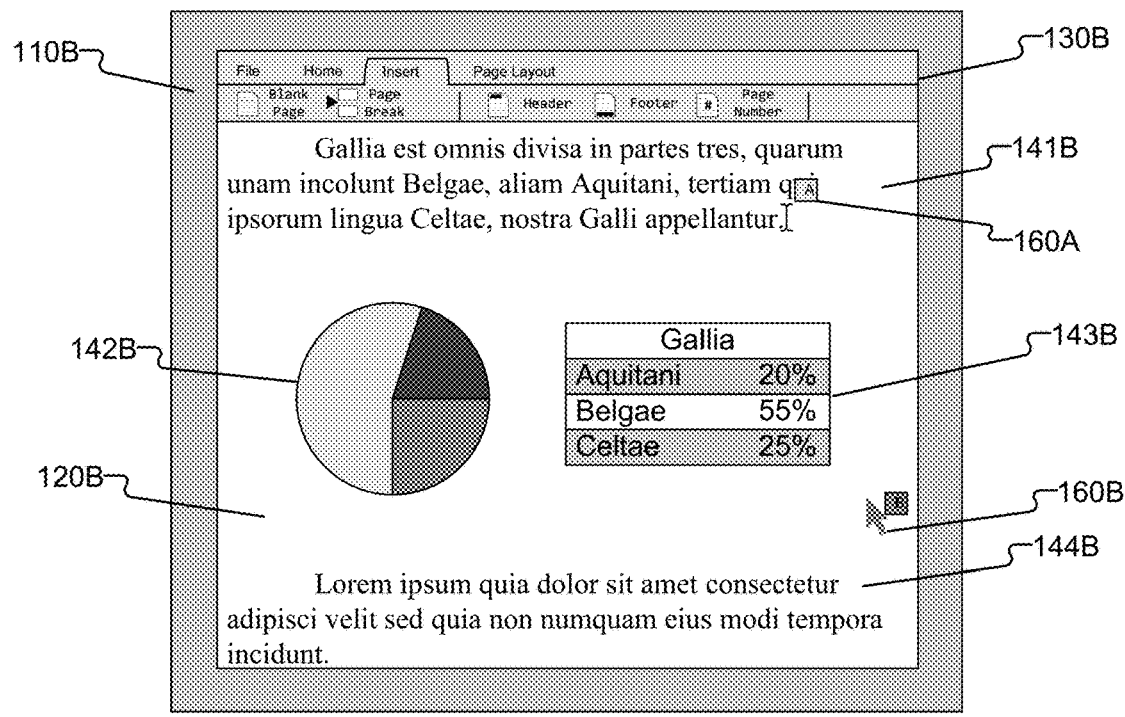

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods for enabling rumored changes for real-time coauthoring are disclosed herein. In a coauthoring environment, edits to a document may be shared between an editor and an endpoint. An editor may be a software application or device at which an edit to a document originates, and an endpoint may be a software application or device to which the edit is transmitted for display or incorporation. As will be understood, multiple editors and endpoints may simultaneously transmit and receive edits to a given document, and a given software application or device may simultaneously be an editor and an endpoint within a coauthoring environment. The systems and methods described herein may be incorporated into the editors, the endpoints, both the editors and endpoints, or may be provided as a server-based service to the coauthors.

When an edit is made by the editor, the document displayed on the endpoint may be updated to include the edit. The edit may implemented differently by the editor and by the endpoint so that the edit can be displayed in real-time on both the editor and the endpoint without causing aberrant behavior on the endpoint. One such method to enable real-time coauthoring is for the edit to be implemented as a concrete change on the editor, where the edit originates, and as a rumored change on the endpoint, with which the edit is shared. Concrete changes are those edits that are fully incorporated into a document's backing store, whereas rumored changes are those edits that are displayed in the document being coauthored, but not fully incorporated into the document's backing store.

When an edit is made, the document on the endpoint may be updated either in real-time or when a save command is initiated (i.e., not real-time). Real-time updates enable the endpoint to display the edit while it is being made on the editor. In contrast, a save command enables the endpoint to incorporate and display edits made since the last save command occurred that may be too complex to implement in real-time or were inaccurately transmitted. Example save commands include when the document is saved on a periodic/scheduled basis (e.g., auto-saved), when a user manually selects to save the document, or when an event occurs that causes the document to save and be merged with other copies of the document. Depending on the frequency of the save commands, the time between entry of an edit on the editor and its display and incorporation on the endpoint may vary.

As will be understood, when the edit is made by an editor on its local copy of a document being coauthored, the editor implements it as a concrete change as the edit is made. The nature of a coauthoring environment, however, is such that there may be a delay of variable length (e.g., for transmission or processing) in implementing the edit on the endpoints, even when the edit is sent in real-time. In some aspects, to reduce the likelihood of conflicting edits or corruption of the document being coauthored, the rumored change may be read-only on the endpoints until it is incorporated as a concrete change.

An edit represented by a rumored change received as part of a real-time update may be incorporated as a concrete change when a save command occurs on the editor. A save command provides the endpoint additional time to process the edit made by the editor compared to a real-time update so that aberrant behavior is not introduced when the edit is incorporated. As will be understood, because a rumored change may contain edits that would have introduced aberrant behavior on the endpoint if implemented in real-time, it may be displayed differently than when the edit is incorporated into the document as a concrete change. For example, if an edit by the editor was to type the word "the" in a document, the real-time update may have missed the letter "e", causing the rumored change to display the typo "th", which is remedied via a save command to incorporate the concrete change so that the document correctly displays the word "the" as it was entered by the editor.

Rumored changes are displayed inline; that is, the rumored change is displayed in the content at the endpoint at the corresponding location where the edit was made by the editor. In various aspects, where content is added by an edit, offsets may be used while displaying the rumored change inline with existing content so as to not interfere with the existing content. In other aspects, where content is deleted or replaced, the rumored change may be displayed in place of the deleted or replaced content.

By enabling endpoints to coauthor in real-time by using rumored changes from editors, an improved user experience is provided; users of applications or devices that could not otherwise concurrently coauthor a document in real-time are enabled to see edits made by coauthors with a reduced risk of corruption to the document. Additionally, the functionalities of a network or a coauthoring application or device are improved by reducing the risk of document corruption and reducing the need to perform merge-updates to synchronize documents while being coauthored. Therefore, a computer using the present disclosure may improve the functioning of the computer itself or effect an improvement in a network or another computer.

Figure 1B:
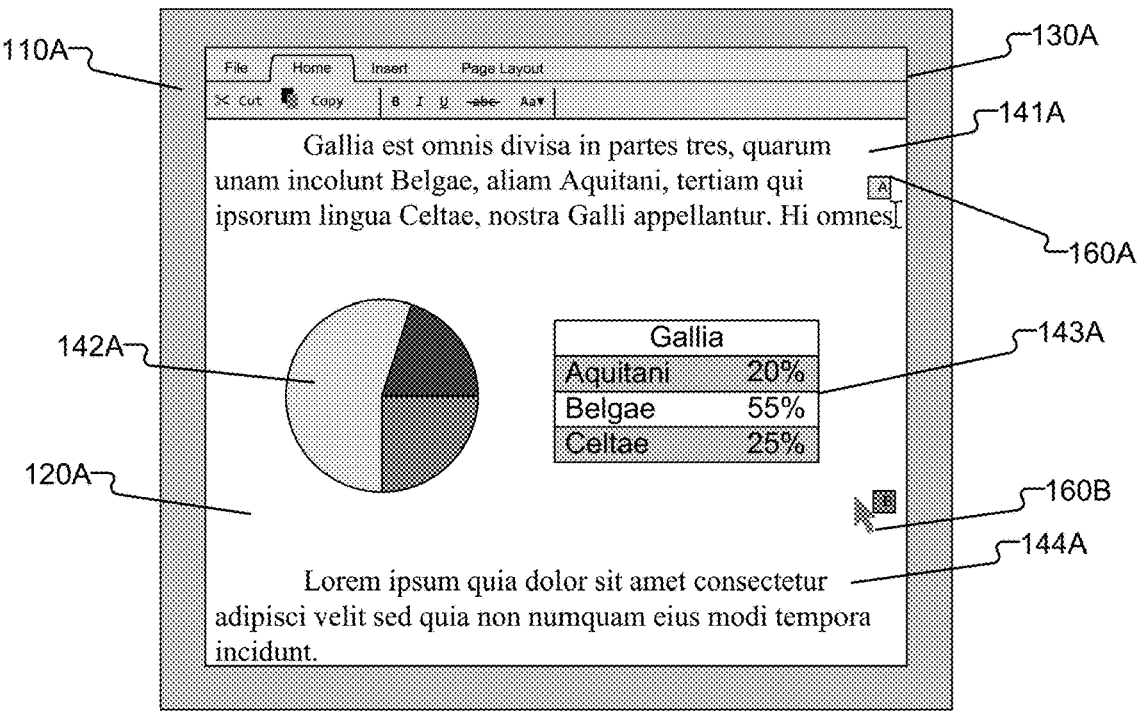
Figure 1B:
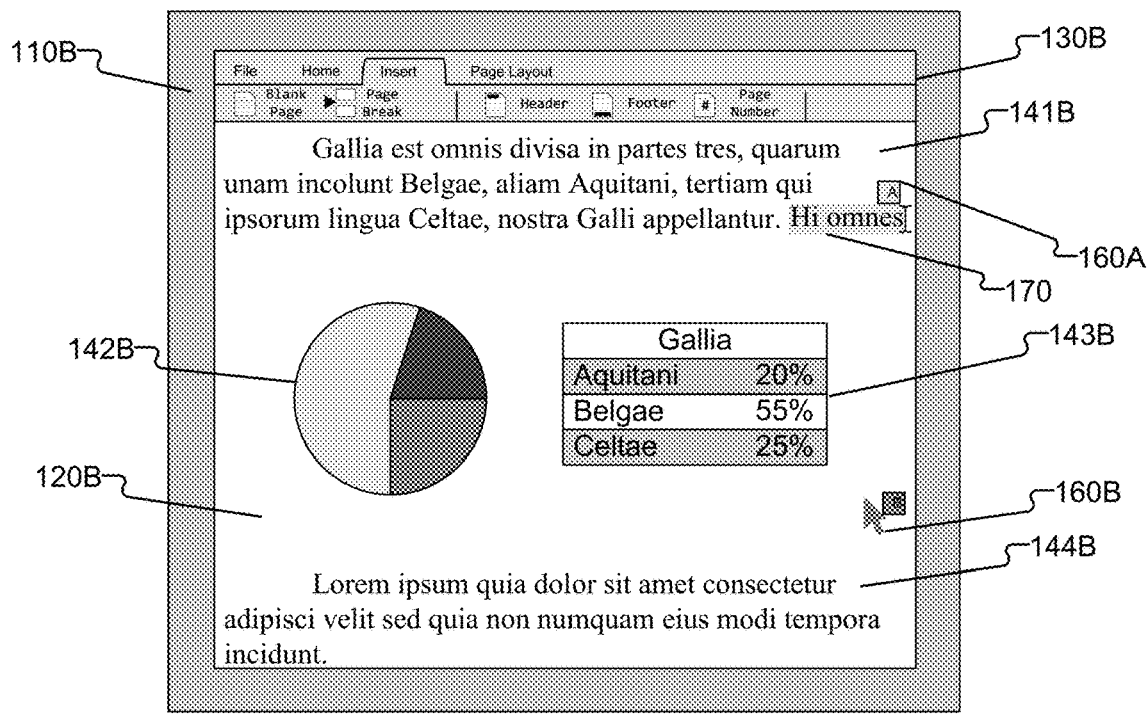
Figure 1C:
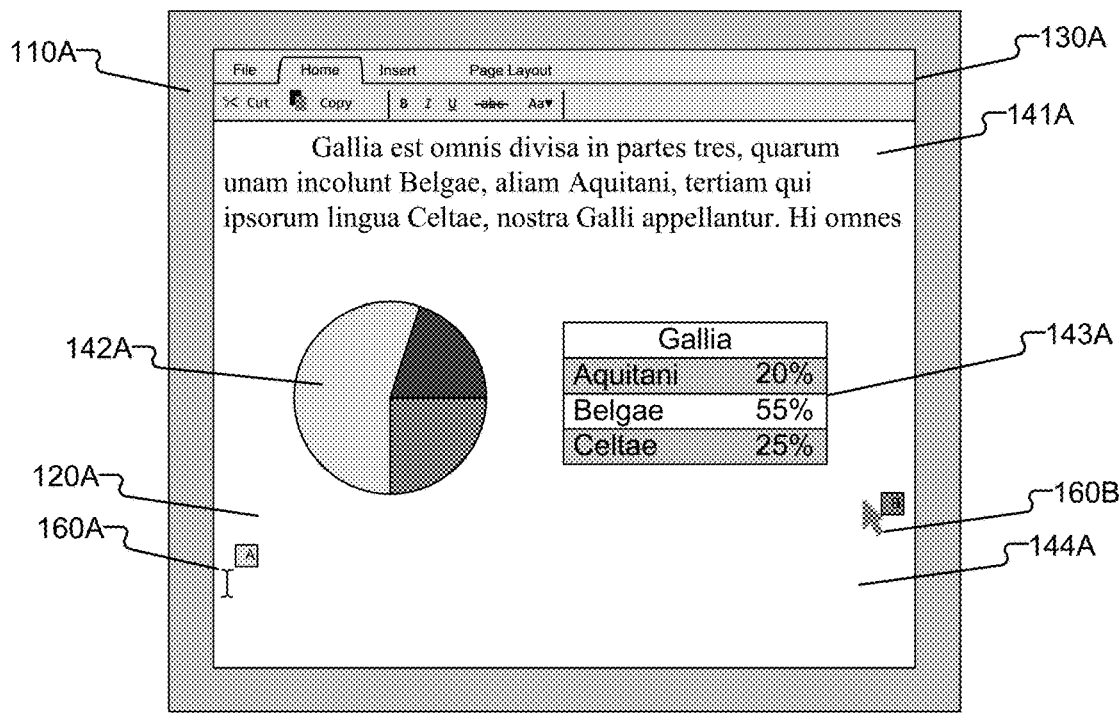
Figure 1C:
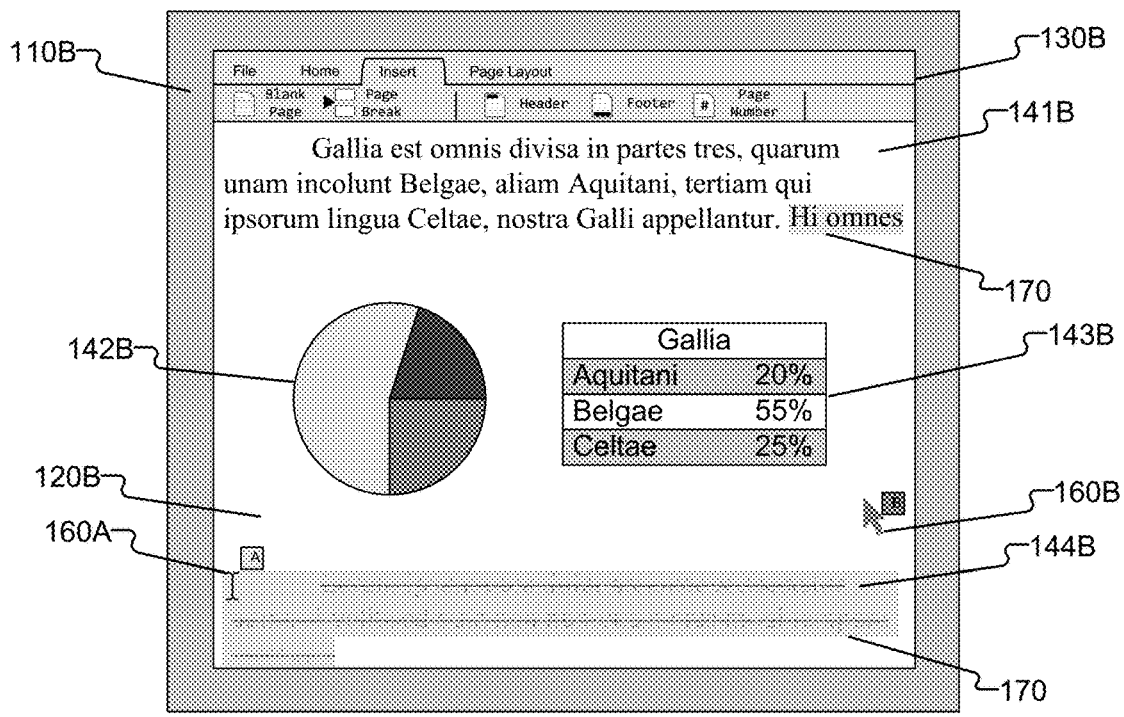
Figure 1D:
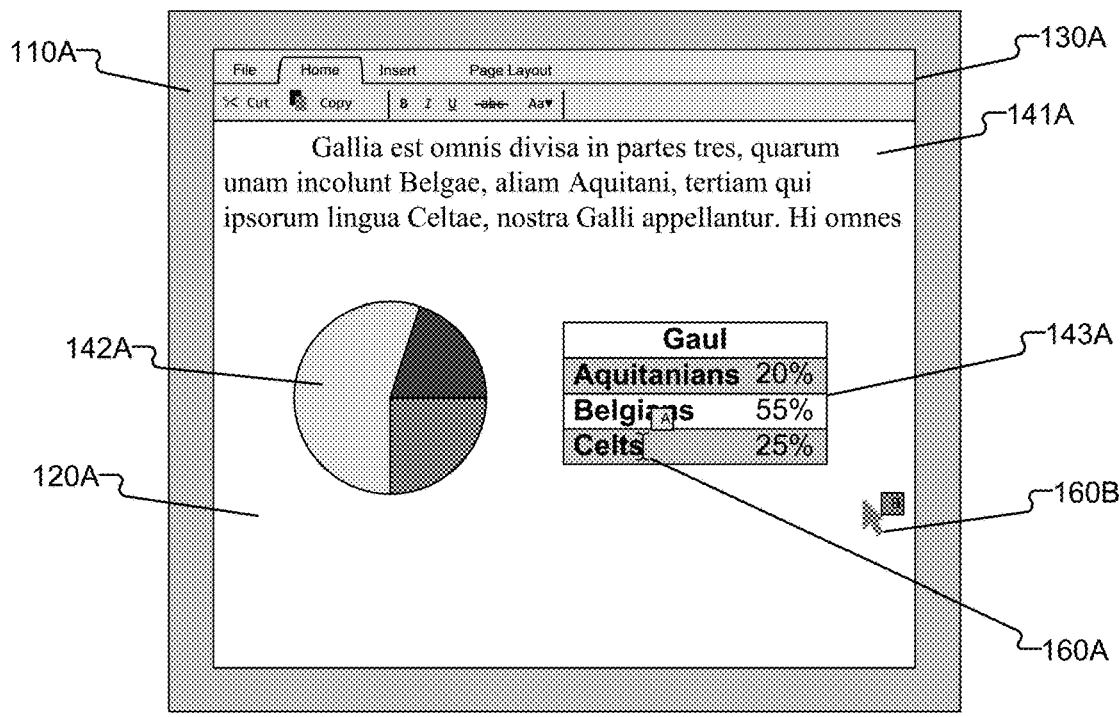
Figure 1D:
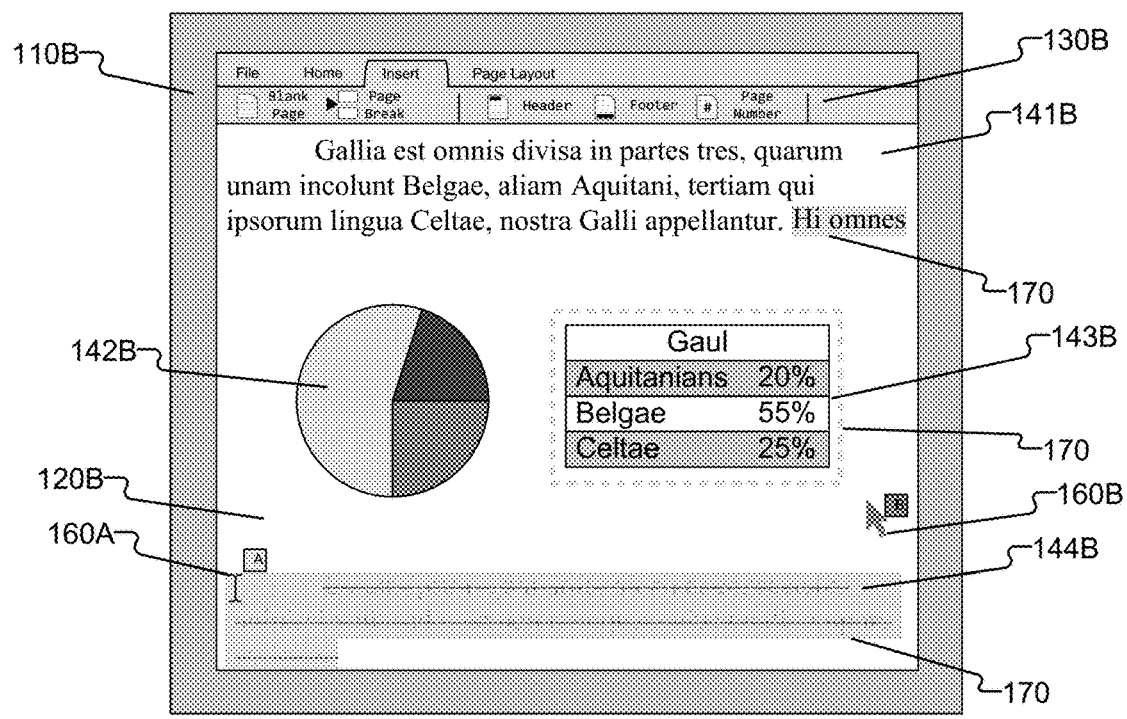
Figure 1E:
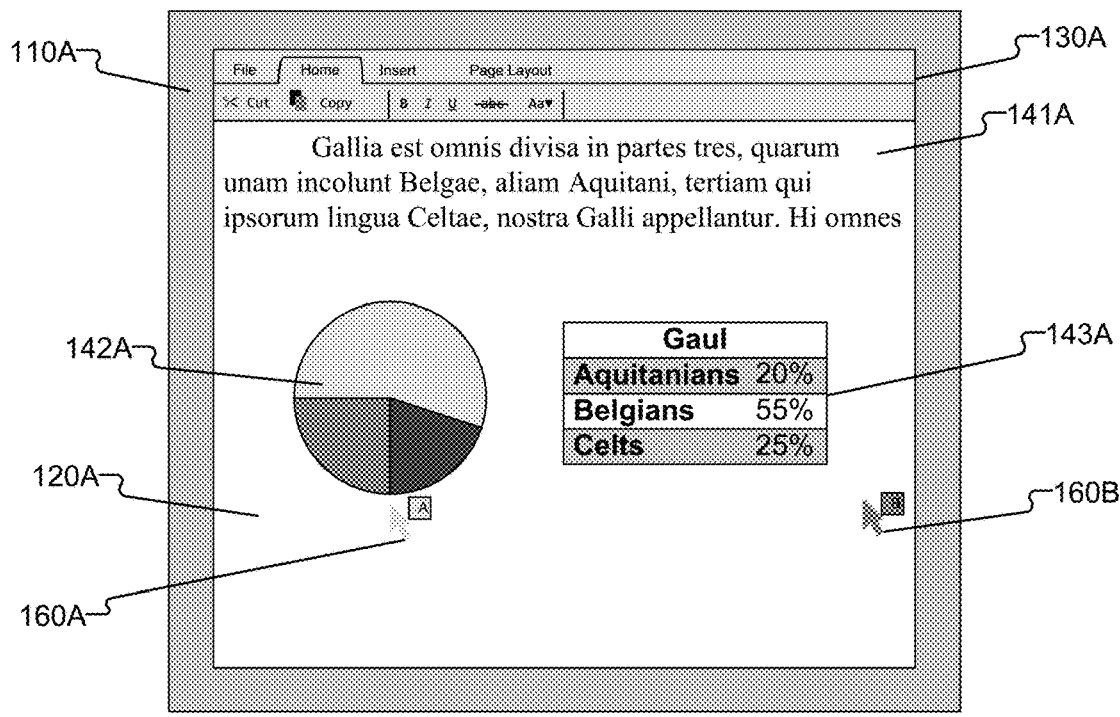
Figure 1E:
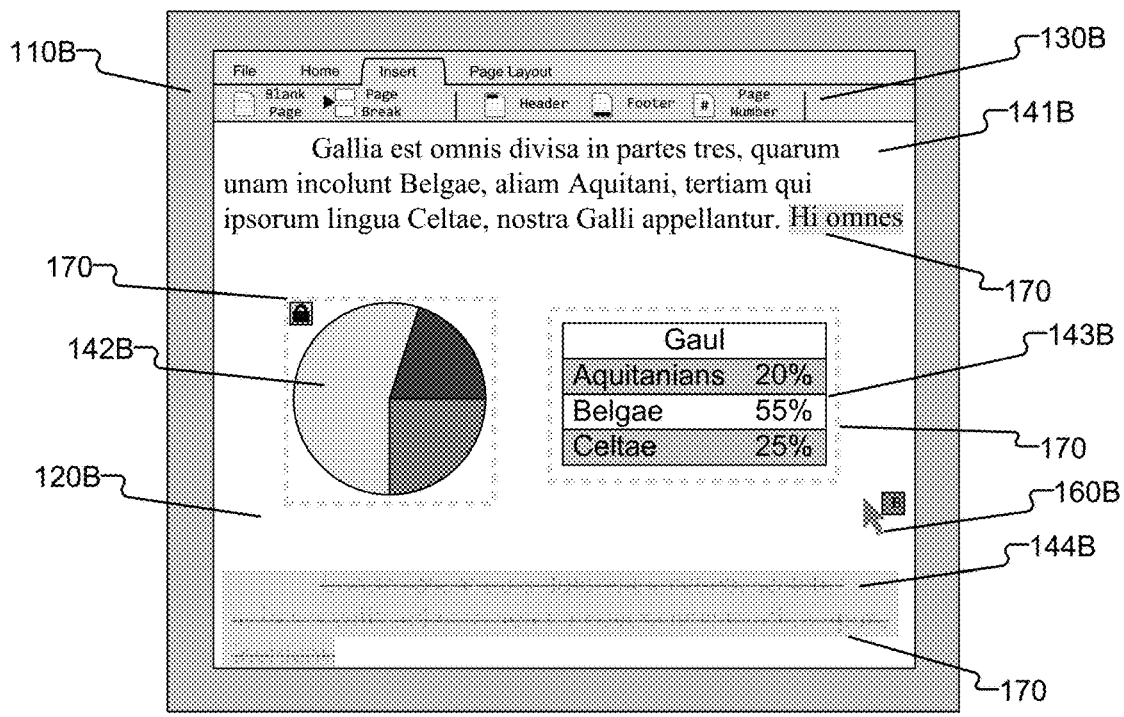
Figure 1F:
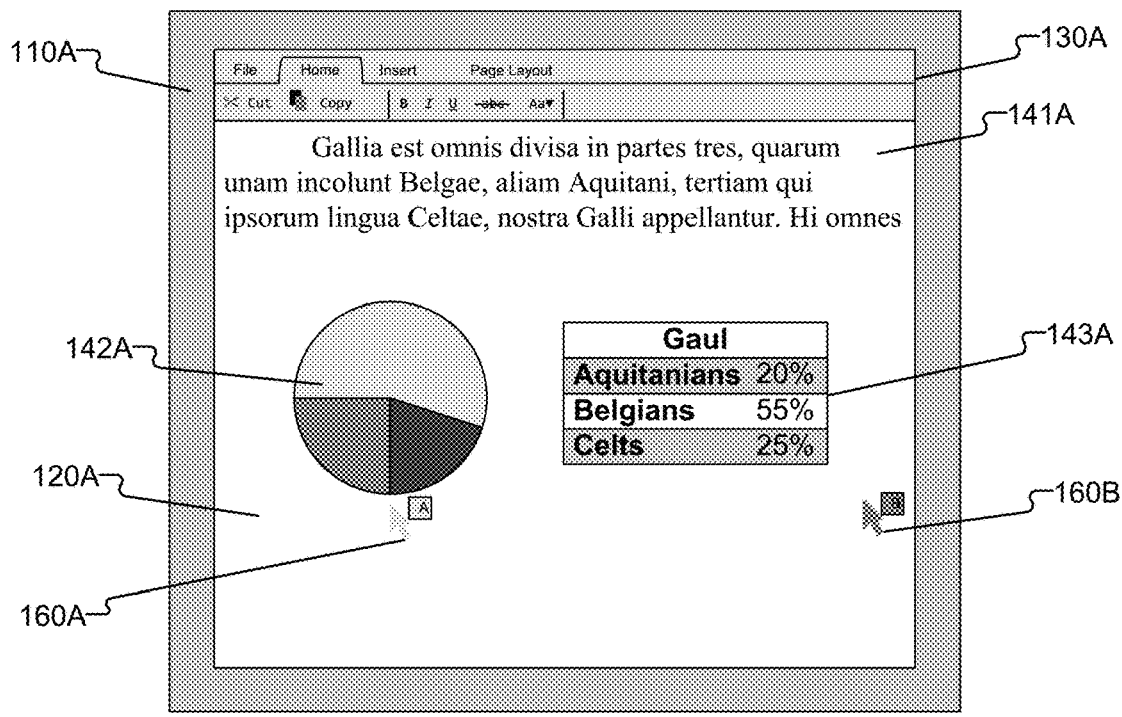
Figure 1F:
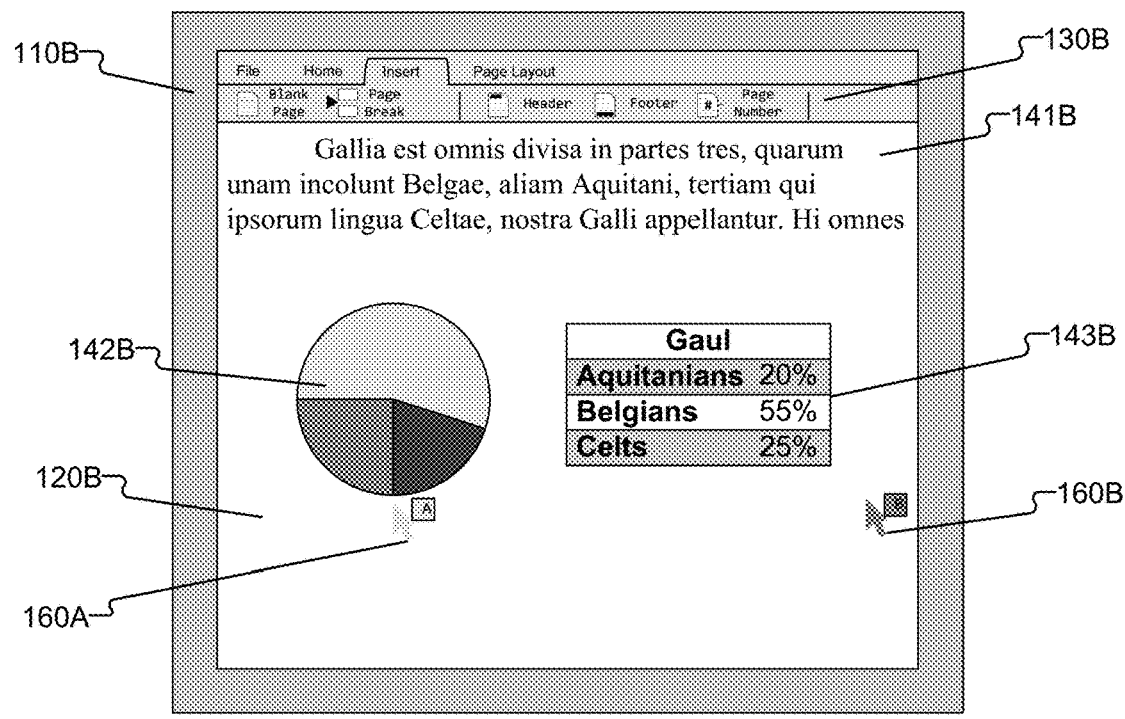
Figure 1G:
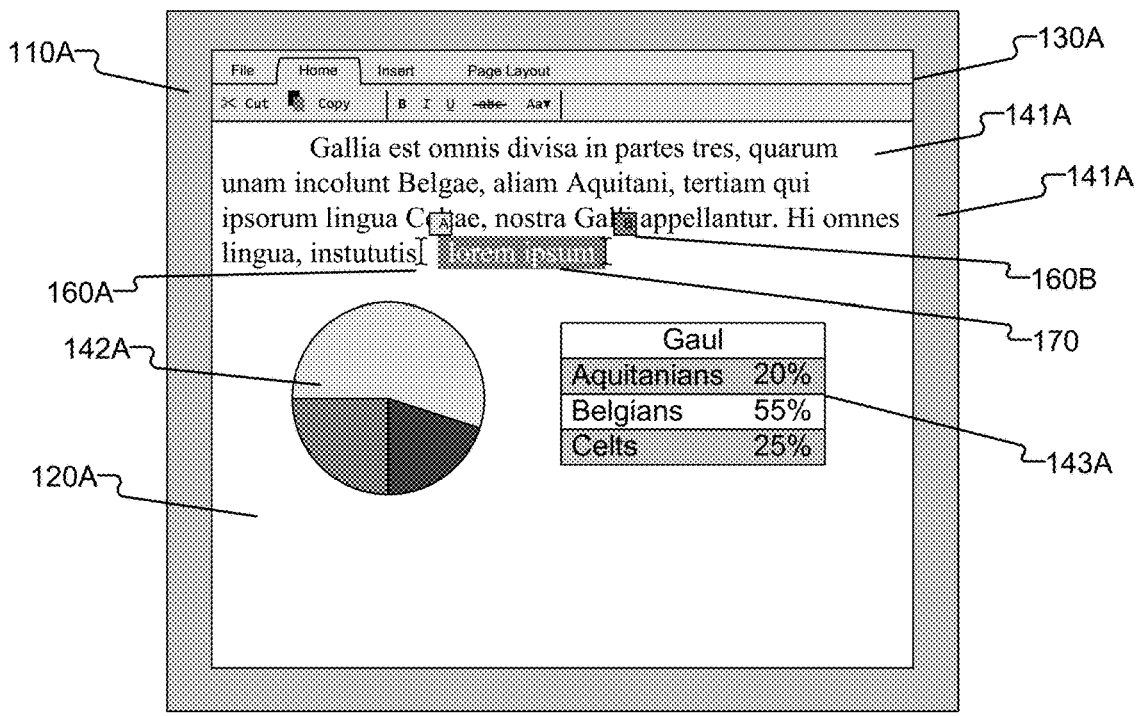
Figure 1G:
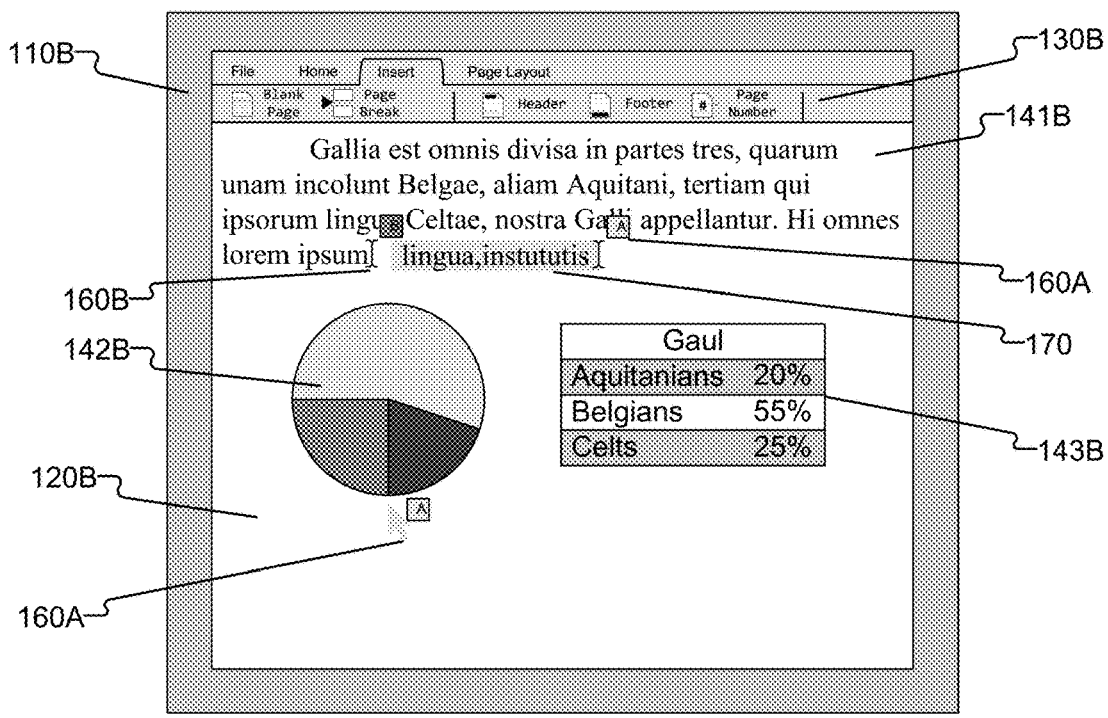
Figure 1H:
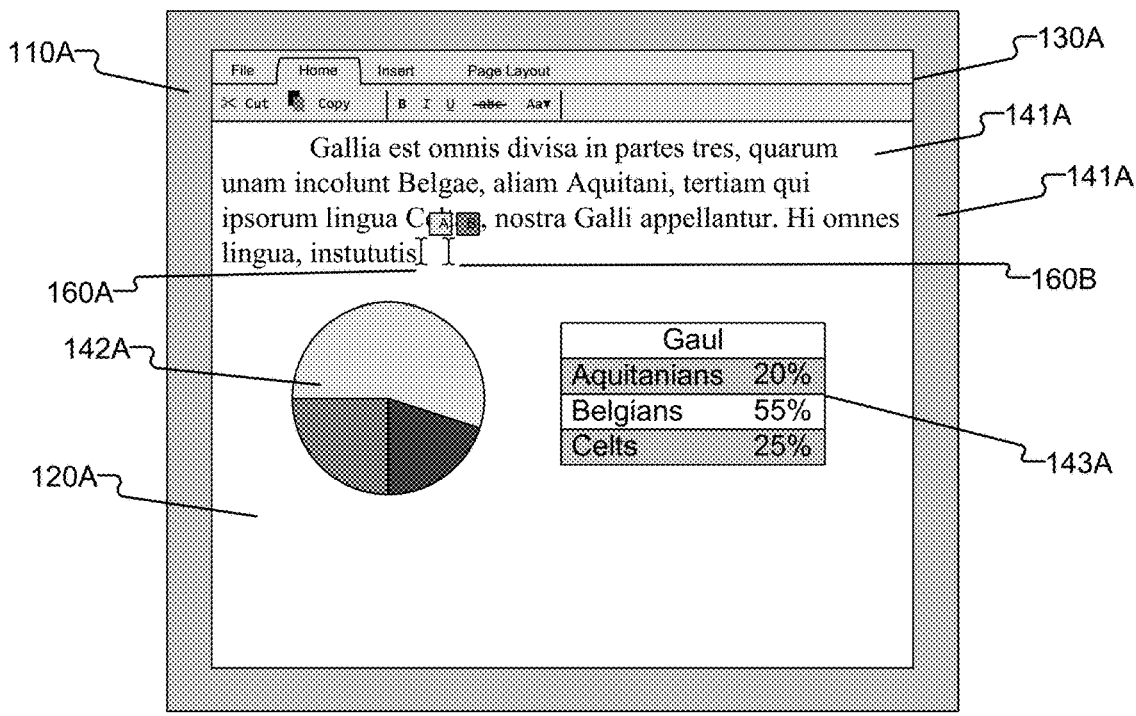
Figure 1H:
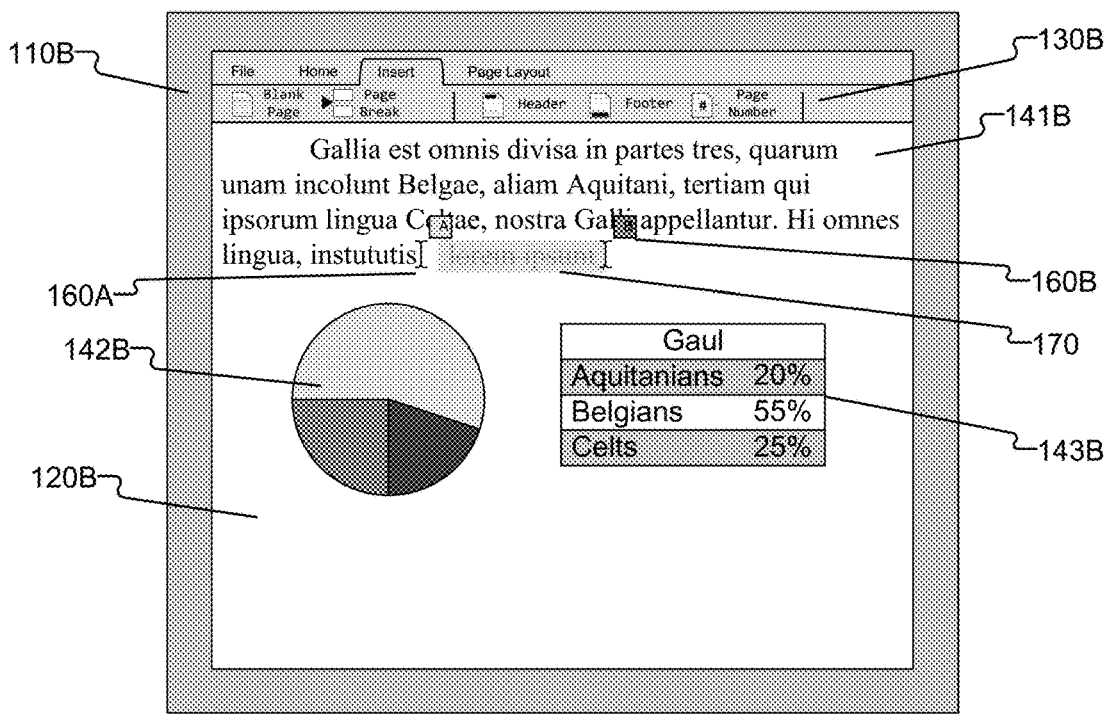

FIGS. 1A-H illustrate an example coauthoring environment 100 in which various edits are made to a document in accordance with the present disclosure. For the purpose of introducing concepts and functionalities of the present disclosure, the FIGS. 1A-H illustrate various example coauthoring functions in a step-by-step fashion. FIGS. 1B-F illustrate edits made by an editor (top) to an endpoint (bottom) and FIGS. 1G and 1H illustrated that the implementation of edits may be done simultaneously in a coauthoring environment 100; a device or application that is an editor may simultaneously be an endpoint, and vice versa.

FIG. 1A illustrates a beginning state of the example coauthoring environment 100. A first computing device 110A and a second computing device 110B (collectively referred to as computing devices 110) are illustrated as displaying a first copy of a document 120A and a second copy of a document 120B respectively (collectively referred to as documents 120) that are identical to each other. The first computing device 110A is illustrated as providing a user interface (UI) 130A (collectively referred to as UI 130) for the first document 120A, and the first document 120A is illustrated as including several sections 141A, 142A, 143A, and 144A. Similarly, the second computing device 110B is illustrated as providing a UI 130B for the second document 120B, and the second document 120B is illustrated as including several sections 141B, 142B, 143B, and 144B. Both computing devices 110 are illustrated as providing cursors 160A and 160B (collectively referred to as cursors 160), which are operable to indicate where individual authors have focus in the documents 120.

As will be understood, both the first computing device 110A and the second computing device 110B may be an editor and may be an endpoint, and more computing devices 110 than illustrated may participate in a coauthoring environment 100. In various aspects, computing devices 110 may include, but are not limited to: personal computing devices, tablets, mobile computing devices, servers, virtual machines, etc. Computing devices 110 may include input devices (e.g., keyboards, touch screens, mice, etc.) and output devices (e.g., display screens, printers, speakers, etc.). As will be understood, depending on the characteristics of the output devices (e.g., aspect ratio, resolution, color settings, zoom level, volume, etc.), identical content may be output differently to different users without affecting the underlying content.

The documents 120 are illustrated as including several sections. Each section corresponds to a portion of the backing store of the document 120 on which it resides. Illustrated in the first document 120A is a first paragraph 141A, an image object 142A, a table object 143A, and a second paragraph 144A. Similarly, a first paragraph 141B, an image object 142B, a table object 143B, and a second paragraph 144B are illustrated in the second document 120B. Each illustrated section in one document 120 corresponds to the similarly numbered section in the other document 120 (e.g., first paragraph 141A corresponds to first paragraph 141B, etc.). Because the documents 120 are illustrated in FIG. 1A as identical copies, each section is displayed as having identical content to its corresponding section. Sections may include any logical division supported by the document backing store provisioning the document 120 and may include subsections (i.e., sections within sections). Example sections include, but are not limited to: pages, paragraphs, sentences, words, tables, charts, images, text boxes, fields, etc. As will be understood, the sections illustrated herein are given for purpose of example, and more or fewer sections than illustrated and more or fewer types of sections than illustrated may be provisioned by documents 120.

The documents 120 are illustrated as being provisioned with UIs 130. The UIs 130 may be provisioned according to various styles, including, but not limited to: ribbons, menus, palettes, etc. Each computing device 110 may provision differently configured UIs 130 and users may navigate the UIs 130 without impacting the document 120 or other computing devices. As is illustrated, a user of the second computing device 110B has navigated to a different portion of the UI 130B than the user of the first computing device 110A has navigated to. Edits may be applied to documents 120 via user selection of the elements from the UIs 130, for example, applying a "Bold" style to a range of text via a UI element, inserting a chart via a subroutine called by a UI element, etc. Various examples of UIs 130 include, but are not limited to: ribbons, menus, modal dialog boxes, non-modal dialog boxes, footers, sidebars, and outspace interfaces.

The cursors 160 illustrated in the documents 120 indicate to users where they and their coauthors have focus in the document 120. As will be understood, a different cursor 160 will be provided for each coauthor and each cursor 160 will be visually distinct from the other cursors 160 to aid in identifying the coauthor associated with the cursor 160. In various aspects, cursors for different users may be differentiated by various means, including, but not limited to different: flags, colors, shapes, and combinations thereof. In various aspects, the cursor 160 that is native to a computing device (e.g., cursor 160A on first computing device 110A) may be differentiated by not having a flag, color, or shape different from the default cursor in a non-coauthoring environment, such that only the cursors of coauthors have differentiating features.

As illustrated in FIG. 1A, when focus is in text, a first cursor 160A for a user of the first computing device 110A is displayed in the first document 120A and second document 120B as a text-input cursor with a light gray flag displaying the shape of a letter "A", which may include a highlight for selected objects/text having the same color. Similarly, when a section has not been selected, a mouse-style pointer having the same coloration and labeling as the text-input cursor may be used as the first cursor 160A. Alternatively, when a section has not been selected, no cursor 160 is displayed for that user. A second cursor 160B is illustrated to convey in the first document 120A and the second document 120B where the user of the second computing device 110B has focus, which is illustrated herein as having a dark gray color and displaying a flag containing the shape of a letter "B" to differentiate the display of the first cursor 160A from the second cursor 160B.

FIG. 1B illustrates a progression from FIG. 1A in which a word is typed via the first computing device 110A. As illustrated, the words "Hi omnes" are typed at the end of the first paragraph 141A. As the words are typed by the editor, they are transmitted in real-time for display on the second computing device 110B as a rumored change. According to aspects, a user of the second computing device 110B when implementing a real-time update would see the words "Hi omnes" as though they were typed on the second computing device 110B; each letter may appear separately (i.e., first 'H', then etc.). In some aspects, this edit may be transparent (i.e., have no style differences from the document 120), while in other aspects a separate style may be applied to indicate that the edit is a rumored change, so that a user of the second computing device 110B can differentiate concrete changes from rumored changes.

As illustrated in FIG. 1B, the rumored change displayed on the second computing device 110B is associated with an indicator 170 for the content included in the rumored change. Although the indicator 170 illustrated in FIG. 1B is shown as highlight having the color associated with the user of the first computing device 110A, other indicators are possible. Similar to cursors 160, each indicator 170 may have a feature or formatting effect associated with a given coauthor to identify the coauthor responsible for a given edit. In various aspects, the indicator 170 may include several features or formatting effects to indicate that a given portion of a section is a rumored change associated with a given coauthor. For example, formats (e.g., bold, italic, underline, etc.), font colors, highlights, borders, typefaces, or font sizes that differ from those of the section and are associated with a given coauthor may be applied to illustrate that text is part of a rumored change. Highlights, animations (e.g., flashing, fading in/out, marching ants, etc.), or borders may be used to indicate that non-text sections (e.g., charts, tables, images, etc.) are affected by a rumored change.

Although the edit made by an editor is a concrete change on the editor's computing device 110, in various examples an indicator 170 may be displayed by the editor's computing device 110 to facilitate user understanding of which edits are still rumored changes on the endpoints. In various aspects, an indicator 170 displayed on the editor may be identical to those displayed on the endpoints.

In various aspects, the indicators 170 may persist until a rumored change is incorporated as a concrete change on the endpoints as a result of a save command on the editor, the rumored change is undone (e.g., the editor types a word and then deletes the word before a save command occurs, the endpoint rejects or removes a rumored change, etc.), or a period of time elapses. When an indicator 170 persists for a period of time, it may indicate an edit that was a rumored change while it is a concrete change. For example, if an auto-save save command occurs every thirty seconds and the period of time to persist an indicator 170 exceeds thirty seconds, the edit will be a concrete change for some of the time period for which the indicator 170 is persisted. In another example, when contiguous edits are made, such as typing several words in a row in the same section, the indicator 170 for the first edit of the contiguous edits may be persisted as long as the indicator 170 is displayed for the latest contiguous edit even when the first edit of the contiguous edits is a concrete change. In various aspects, the indicator 170 may be removed when it is no longer persisted, while in other aspects, the indicator 170 may fade away or evaporate over a period of time when it is no longer persisted.

When an edit that adds content cannot be implemented in real-time, an endpoint may display the section of the document 120 as being out-of-date or lock that section from other coauthors editing the section. When a section is noted as out-of-date or locked, an indicator 170 may be applied to the section to indicate which user applied an edit that could not be implemented in real-time. Additionally, icons that communicate that the section is out-of-date or locked (e.g., a clock, hourglass, lock, etc.) may be displayed in or proximate to the section. The status of a section being out-of-date or locked may optionally be displayed on the editor to alert the user that made the edit that endpoints are no longer receiving updates to the indicated section in real-time.

FIG. 1C illustrates a progression from FIG. 1B in which a section is deleted. As illustrated, the second paragraph 144A has been deleted from the first document 120A, for example, by selecting all content in the paragraph and performing a "cut" action (e.g., receiving a keyboard shortcut, receiving selection of an associated UI element, etc.), by selecting all content in the paragraph and performing a delete action (e.g., receiving selection of a backspace or delete key), individually deleting all elements within the paragraph (e.g., holding down or repeatedly pressing the backspace or delete keys), etc.

When an edit that deletes content can be implemented in real-time, an endpoint may display the edit as it happens. For example, an editor that implements an edit to delete a word from a paragraph may have the edit displayed via an endpoint as a rumored change that applies a strikethrough or ghosting effect to the deleted word in addition to an indicator 170. Alternatively, the editor may display the deletion as a rumored change the same as it occurs on the editor; removing each letter of the word from display as the editor removes that letter, but not implementing that edit as a concrete change in the local copy of the document 120 until a save command occurs.

When an edit that deletes content cannot be implemented in real-time, an endpoint may display the section of the document 120 as being out-of-date or lock that section from other coauthors editing the section. When a section is noted as out-of-date or locked, an indicator 170 may be applied to the section to indicate which user applied an edit that could not be implemented in real-time. Additionally, icons that communicate that the section is out-of-date or locked (e.g., a clock, hourglass, lock, etc.) may be displayed in or proximate to the section. The status of a section being out-of-date or locked may optionally be displayed on the editor to alert the user that made the edit that endpoints are no longer receiving updates to the indicated section in real-time.

As illustrated in FIG. 1C, the deletion of the second paragraph 144A from the first document 120A is implemented in real-time as a deletion of the second paragraph 144B from the second document 120B. In the example, the deleted text is illustrated as having both a ghosted effect and a strikethrough effect. Depending on how the edit was implemented, the user of the second computing device 110B may see different actions as the indicator 170 is applied. For example, if the editor selected the second paragraph 144A and deleted it in a single action (e.g., via a cut command, a delete command, etc.) the indicator 170 and associated text effects may be applied at one time. In another example, if the editor placed the cursor 160A at the end of the second paragraph 144A and held down the backspace key, the indicator 170 and associated text effects may be applied to each letter in the second paragraph 144B as each letter is deleted from the second paragraph 144A.

FIG. 1D illustrates a progression from FIG. 1C in which a table object is edited. As illustrated, the table object 143A includes several subsections (e.g., cells) that contain text. In various aspects, when a section including subsections is edited, the section may be locked or not updated, causing it to be out-of-date on the endpoint. In other aspects, the edit may be implemented as a rumored change to the parent section (e.g., a table object), the subsection (e.g., a cell of the table object), or the contents thereof (e.g., the text). In the illustrated example, table object 143A has had the text in its cells edited and table object 143B is indicated as being affected by a corresponding rumored change by an indicator 170 associated with the editor, which is shown in the present example as a "marching ants" effect.

As illustrated, the editor has applied an edit to the text in table object 143A as a concrete change, and the endpoint displays a rumored change to table object 143B corresponding to the concrete change. The rumored change, however, is illustrated as imperfectly displaying the edit made by the editor. As illustrated in FIG. 1D, the edits to table object 143A include text modifications and style modifications (e.g., applying a bold style to the text), that are imperfectly displayed.

In various examples, imperfect display may be the result of reducing the complexity of an edit for display in real-time as a rumored change, or may be the result of errors in transmitting the edit. In the illustrated example, the style modifications may have been omitted as a method to reduce complexity in the edit, and the edits to the third and fourth cells (i.e., those originally containing the text "Belgae" and "Celtae") may be imperfectly displayed due to transmission errors.

In some aspects, rumored changes may omit style modifications to improve the speed at which edits may be processed and transmitted for display as rumored changes by reducing the amount of data transmitted in real-time. For example, text in an edit may be transmitted without any formatting information, and the rumored change may be formatted according to a standardized style when displayed by the endpoint. In another example, only limited formatting information (e.g., bold, underline, italic, etc., but not typeface, line spacing, or indent) may be transmitted with the edit to be displayed as part of the rumored change. A standardized style may be defined by the section being edited (e.g., if a section used a style before the edit, the rumored change will be displayed in that style), or may be a style associated with a given coauthor by the endpoint to identify that coauthor. In various aspects, the standardized style may include a typeface, a formatting (e.g., bold, not italic, color, highlight, etc.), or a font size. The omission or reduction of formatting information allows for a reduced complexity edit to be transmitted and processed for display in real-time more efficiently, albeit with the potential for imperfect display until a save command occurs.

A rumored change may also imperfectly display the edit made by the editor when various transmission errors occur, which may include loss of connection between coauthors, too many dropped packets in a given time period, or corruption of the edit during transmission. Either an editor or an endpoint may determine that transmission errors have occurred and cease sending or displaying rumored changes respectively. In aspects where a rumored change is imperfectly displayed due to transmission errors, the endpoint may apply a locked status to the section that the rumored change was displayed within. For example, if transmission errors are detected, edits from an editor may be determined to be imperfectly displayed, and the section in which the rumored changes are displayed may be locked by the endpoint. In other aspects, when transmission errors are detected, the rumored change may not be displayed (or be removed from display), and the editor may be treated as no-longer coauthoring in real-time with the endpoint, such that future edits will not be displayed in real-time on the endpoint until a save command occurs.

FIG. 1E illustrates a progression from FIG. 1D in which an image object is edited. As illustrated, the editor has edited an orientation of the image object 142A, which in the illustrated example, is an edit that the editor is not capable of handling in a real-time update. When an edit is made to a section that cannot be handled in a real-time update, the section may be locked, as indicated by the indicator 170 using marching ants and lock icon in FIG. 1E, and no further changes from the editor will be displayed for the section until a save command occurs.

FIG. 1F illustrates a progression from FIG. 1E in which a save command occurs on the editor. Save commands may occur at a selected interval (e.g., during a scheduled autosave), when a user selects a save functionality (e.g., a save icon, a share button, etc.), or when a user selects or performs another action that results in merge of the copies of the document 120 being edited. When a save command occurs, the first document 120A and the second document 120B will normalize such that any edits that are concrete in one copy of the document 120 will be made concrete in the other copies of the document 120. In various aspects, normalizing the copies of the document 120 may involve removing locked statuses from sections, and implementing any edits that could not be implemented in real-time on the endpoint so that changes that were rumored are incorporated as concrete changes. After a save command is implemented, the copies of a document 120 once again contain identical content.

In one aspect, where the copies of the document 120 provided to each coauthor are copies based on a master copy of the document 120, when a save command is initiated by a coauthor, any concrete changes from the given coauthor are committed to the master copy and then transmitted to the other coauthors' copies. Any rumored changes displayed by a saving coauthor, however, are not committed to the server-hosted version of the document 120. The server-hosted document 120 may then communicate the committed changes to the coauthors so that any rumored changes from the saving coauthor are converted to concrete changes. As will be understood, in aspects or examples where the rumored change imperfectly displayed the edit, due to a reduction in complexity or a transmission error, the conversion to a concrete change will include any edits that were not included in the rumored change.

In various aspects, the save command may be communicated over different channels than real-time updates. For example, real-time updates may be communicated over a fast channel directly between coauthors (via any interconnecting networks and servers), whereas save commands may be communicated via a slower channel to a master copy of the document 120 where the concrete changes are committed to the master copy before being forwarded to the endpoints. In various aspects, the master copy may be hosted by one of the coauthors acting as a server or as a dedicated server or document storage system such as SharePoint® portal servers (offered by MICROSOFT CORPORATION of Redmond, Wash.).

Save commands may be initiated individually or collectively in various aspects. When a save command is initiated individually, the edits made by one saving coauthor are committed as concrete changes to the document 120. When a save command is initiated collectively, such as when a host of a master copy of the document 120 signals all coauthors to commit their edits, each coauthors' changes are committed as concrete changes to the document 120. In the event of conflicting edits, the host of a master copy of the document 120 or each coauthor (individually or collectively) may determine how to resolve the conflicting edits.

FIG. 1G illustrates a progression from FIG. 1F in which the coauthors each make changes to their copies of the document 120. The user of the first computing device 110A has made an edit to add the text "lingua, instututis" at the end of the first paragraph 141A, while the user of the second computing device has made an edit to the end of the first paragraph 141B to add the text "lorem ipsum" in a bold format. Each of the copies of the document 120 implement their respective user's edits as concrete changes and display the coauthor's edits as rumored changes. Because, however, these edits were made in the same location, they may be deemed to be conflicting edits, the resolution of which is discussed in greater detail in relation to FIG. 1H.

Due to transmission and processing delays, it may not be possible to prevent coauthors from selecting the same location to apply an edit. In such a case, endpoints may use vector clocks, hash values, checksums, or similar information indicating a state of the editor's document at the time an edit was made to determine where the editor believes a change to have been made. The endpoint may use this determination to properly place the editor's edits in the section relative to any edits made locally on the endpoint. In various aspects, rumored changes may be offset from the content and concrete changes to prevent interference. As illustrated in the example of FIG. 1G, the first document 120A and the second document 120B have applied an offset of one character to display the rumored changes inline behind the local edits. In another example, an offset may display the rumored change inline ahead of local edits. In other aspects, the rumored change may be displayed overlaid with the concrete change, where the section animates between the two changes. In an alternative example, an editor may display the coauthor's edit as a comment—no longer inline as a rumored change.

FIG. 1H illustrates a progression from FIG. 1G in which a save command occurs and conflicting edits are resolved. Because the coauthors may or may not approve of each other's edits, various conflict resolutions may be achieved.

In the illustrated example, the first computing device 110A is designated as a primary coauthor so that its edits take precedence in the event of a conflict. The conflicting edits made by other coauthors may be deleted or retained as rumored changes until accepted by the primary coauthor. In the illustrated example, deleting the conflicting edits may occur via the conflicting edits being committed as they are displayed by the primary coauthor and then deleted, resulting in a rumored change of the deletion for the other coauthors. In another example, the conflicting edits may be discarded or never incorporated, thus ignoring the conflict. In another aspect, the conflicting edits may remain displayed as rumored changes until the primary coauthor responds to a prompt to accept the rumored change as a concrete change or reject the change and discard it.

When a coauthor has its concrete changes discarded or reverted to rumored changes, the coauthor may be prompted to save the local copy of the document 120 as a new document 120. In various aspects, the coauthor may continue coauthoring the original document 120 (now absent the previously conflicting edits made by that coauthor) or choose to work of the new document 120.

According to aspects, the copies of the document 120 may be branched such that when the rumored change is discarded, a new document 120 (or a new version of the original) is created. Any users accessing different branches will not be coauthors; they are accessing different documents. Any coauthors, whether reading the document 120 or making edits when a branch is made may be prompted whether to continue their edits on a given branch. For example, if a first branch and a second branch are created to resolve a conflict, all the coauthors may be prompted for which version they will continue to coauthor, such that some coauthors may choose the first branch and some the second branch or all the coauthors choose one of the branches. Alternatively, one branch may be designated as the main branch, on which all coauthors will continue coauthoring, and the other branch may be saved, similar to a save-as action, so that the conflicting edit is preserved for later use or reference.

Figure 2:
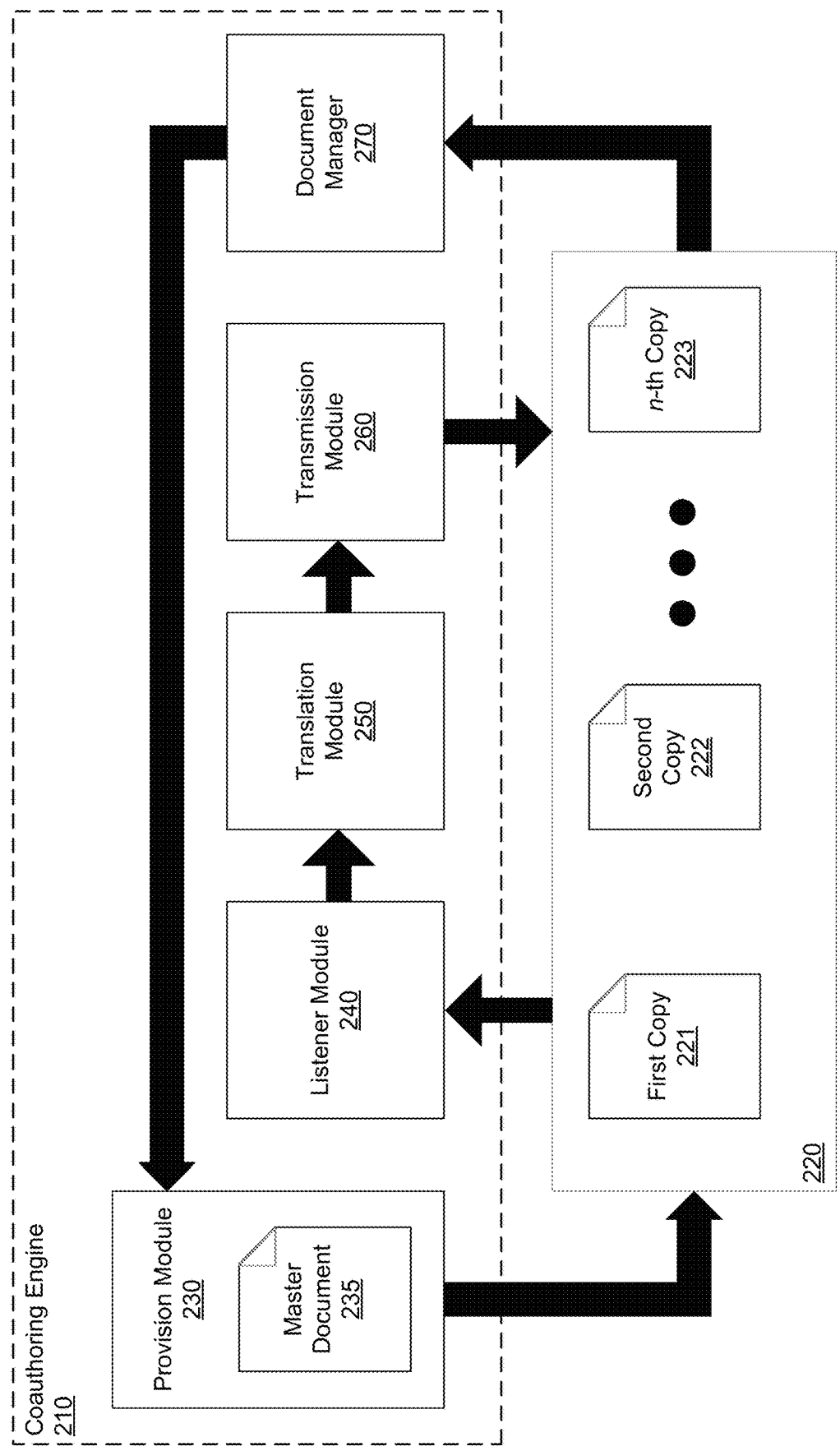
FIG. 2 is a block diagram of a suitable coauthoring environment.

FIG. 2 is a block diagram of a suitable coauthoring environment 200. In FIG. 2, a coauthoring engine 210 and a plurality of copies 220 of a master document 235 are illustrated as elements of the coauthoring environment 200.

The coauthoring engine 210 is operable to communicate with the plurality of copies 220 of a master document 235 being coauthored to enable rumored and concrete changes to be transmitted and implemented between the coauthors. According to aspects, rumored changes are transmitted for edits to be shared in real-time amongst the plurality of copies 220 without being incorporated into the master document 235. Rumored changes are configured for transmission in real-time and therefore may omit some data of the edit in favor of quick transmission and processing. For example, edits for text may be transmitted as characters without formatting, or edits to an image may be transmitted as boundaries without shading information for pixels or objects within the boundaries. Edits are incorporated into the master document 235 in response to a save command and then shared to the plurality of copies 220 to replace the rumored changes. In various aspects, the rumored changes may be replaced gradually or suddenly with concrete changes in response to a save command, as each copy may incorporate the concrete changes in a foreground or a background task. In various aspects, the coauthoring engine 210 may be provided by the computing devices 110 of the coauthors, a server accessed by the coauthors, or distributed between a server and the computing devices 110 of the coauthors.

The plurality of copies 220 of the master document 235 is illustrated as encompassing a first copy 221 provided to a first user, a second copy 222 provided to a second user, and an n-th copy 223 provided to an n-th user. As will be understood, one of the coauthoring users may be directly accessing the master document 235 that is provided to the other coauthors, or the master document 235 may be provided indirectly to each of the users from a server as copies. In various aspects, the master document 235 may be a word processing file, a presentation file, a spreadsheet file, a notes file, or other file capable of being authored by multiple users in real-time.

The coauthoring engine 210 includes a provision module 230, a listener module 240, a translation module 250, a transmission module 260, and a document manager 270. Each module and/or manager comprises code executing on a suitable computer system, examples of which are described herein.

The coauthoring engine 210 is illustrated as including a provision module 230, operable to provide coauthors with copies of the master document 235 being coauthored. In various aspects, the master document 235 may be hosted by a server and accessed remotely by each of the coauthors, or may be provided by one coauthor, who accesses the master document 235 locally to the other coauthors. The provision module 230, therefore, may be managed by a server remote to all the coauthors, or by a computing device 110 of one of the coauthors that is remote to the other coauthors.

The provision module 230 provides copies of the master document 235 to each of the remote users. Users who access the master document 235 may be coauthors who have read and write permissions and share their edits with other users, viewers who have read access and receive edits shared by other users, and offline users who have either read and write access or read access, but do not share edits with other users. In various aspects, coauthors may have limited write permissions, such that some coauthors may only write to portions of the document or only make comments. Users may change between being coauthors, viewers, and offline users as a coauthoring session progresses. For example, a user may begin a coauthoring session as a viewer, be granted write permissions and become a coauthor, lose connection to the coauthoring session and become an offline user, and rejoin the session to become a coauthor again. In various aspects, when users first join (or rejoin) a coauthoring session they may be viewers until the next save command occurs, so that they are prevented from making edits until an up-to-date copy of the master document 235 is provided to them. In some aspects, when a user joins the coauthoring session, a save command is initiated.

In some aspects, coauthors may join the coauthoring session when they are invited by a user currently editing a copy of the master document 235, which may begin a coauthoring session (if no other users are coauthoring copies of the master document 235 at the time of the invitation) or expand the coauthoring session. In other aspects, each user may individually access the master document 235 as an offline user, and a coauthoring session may begin or expand when two or more offline users agree to coauthor the master document 235 and share their edits.

Indications of edits made to one or more of the plurality of copies 220 during a coauthoring session are detected by a listener module 240. In some aspects, the listener module 240 is provided by a server part of the coauthoring environment operable to collect the edits made by each of the coauthors. In other aspects, each computing device 110 hosting a copy for coauthoring may provide its own listener module 240 on the backing store of the local copy. In various aspects, the computing devices 110 hosting copies of the plurality of copies 220 may be local machines, such as an individual user's desktop, laptop, tablet or mobile computing device 110, or the computing devices 110 may be host machines of a cloud computing service such as AZURE™ (provided by MICROSOFT CORPORATION of Redmond, Wash.) accessible remotely by one or more users. When multiple users access a single copy of the master document 235 as cotenants of a virtual machine provided by a host machine, the listener module 240 is operable to distinguish changes made by each of the cotenants.

The listener module 240 in various aspects may record some or all indicated edits made to content by a coauthor. In some examples, the listener module 240 may only listen for text edits (additions or deletions), while in other examples, text and object edits (e.g., images, charts, tables, etc.) may be listened for. Additionally, some edits may be ignored or omitted by the listener module 240, such as, for example, text formatting edits (e.g., changing a bold status, an italic status, and underline status, a font color, a typeface, a font size, a highlight effect, etc.). Edits listened for by the listener module 240 may include user-generated edits (e.g., manually typing text, using a keyboard shortcut (e.g., CTRL-V), manually deleting text, selecting a UI element (e.g., a paste interface), etc.) and system-generated edits (e.g., autocorrect, spellcheck replacements, replace all commands, macros, etc.).

In various aspects, the listener module 240 may listen for edits that can be represented by rumored changes as well as edits that cannot be represented by rumored changes or transmitted in real-time. The listener module 240 may determine which edits are and are not capable of being represented by rumored changes, and cause sections that are affected by edits that cannot be represented by a rumored change transmitted in real-time to be locked. A section may be locked via an explicit command transmitted to the plurality of copies 220, or by ignoring the edit, which may result in a state-mismatch between copies of the plurality of copies 220 and thereby prevent further edits to that section until a save command occurs and the states of corresponding sections once again match in the plurality of copies 220.

When an edit is detected by the listener module 240 that can be represented by a rumored change transmittable in real-time, the section and position within the section that the edit is made are noted along with the edit itself. The edit information is then transmitted to a translation module 250 to translate the edit into rumored change for transmission to the other coauthors' copies of the master document 235.

Edits detected by the listener module 240 may be translated into a rumored change by a translation module 250. According to aspects, the listener module 240 and the translation module 250 are provided by the same computing device 110. The translation module 250 is operable to translate the edit detected by the listener module 240 into a format conducive for transmission and display in real-time for the other copies from the plurality of copies 220 (i.e., endpoints). The translation module 250, in various aspects, may translate the edit from a format used by the backing store of an editor into a format intelligible by a multitude of endpoints (e.g., different document editors, different versions of the same document editor, etc.). Such a format may include, for example, the Java Script Object Notation (JSON) format or the eXtensible Markup Language (XML) format.

In various aspects, the translation module 250 may include the content information (how the edit affected the content), positional information (where the edit affected the content), author information (which coauthor performed the edit), and state information for the edit (what the content affected by the edit is and was on the editor).

In various aspects, the state information of the edit may be represented by a vector clock. The vector clock may include a state of the editor's copy of the master document 235 and the state of any section edited by the editor. In various aspects, endpoints may use the editor's vector clock to compare against their own vector clocks to determine whether an edit from an editor conflicts with a local edit or whether to lock a section due to state mismatch.

In various aspects, to reduce network traffic and improve processing the rumored change on the computing devices 110 of the coauthors, the edit may have some information omitted by the translation module 250, such as, for example, formatting information may be omitted from text edits. By omitting information, however, the rumored change may no longer be a perfect reflection of the edit and is therefore may not be a what-you-see-is-what-you-get (WYSIWYG) preview of the edit. By omitting formatting, and reducing the amount of error correction schema needed for transmitting an edit, rumored changes enable the coauthoring engine 210 a style associated with an editor to be applied to the rumored change without conflicting with itself (e.g., a coauthor whose edits are associated with a green text style applying a color to text as an edit) and the amount of data needed to be processed by endpoints is reduced.

In some aspects, when some or all of the content information from an edit is omitted, the translation module 250 may generate a blank rumored change or a lock. A blank rumored change may simply apply an indicator 170 on the other copies of the plurality of copies 220 to alert the coauthors that an unspecified change has been made to the indicated portion of a section. The indicated portion may also be locked from edits by the coauthors until a save command occurs, and such a lock may be implemented via an explicit command or a state-mismatch indicated by vector clocks transmitted between an editor and an endpoint.

As illustrated, a transmission module 260 is provided that is operable to transmit the edit translated by the translation module 250 for display as a rumored change on each of the endpoints. According to aspects, the translation module 250 and the transmission module 260 are provided by the same computing device 110. Because an edit that originates from an editor is a concrete change for that coauthor, the transmission module 260 does not transmit the translated edit to the editor, only the endpoints. Each of the receiving endpoints, when joining the coauthoring session, may provide the transmission module 260 their contact information (e.g., IP address, MAC address, usernames, permissions, etc.) so that the transmission module 260 knows where and how to transmit the translated edit for proper receipt.

Each of the endpoints receiving the translated edit is operable to interpret the translated edit in real-time for display as a rumored change. When the endpoint receives the translated edit from the transmission module 260, the content information is displayed on the endpoint according to the positional information and the state information as a non-editable (e.g., read-only) rumored change. The endpoints may apply formats to the rumored change based on author information included in the translated change to identify the source of the edit on the endpoint. The endpoints may also apply locks to sections based on explicit commands to lock a section or when a mismatch in the states of a section between the endpoint and the editor are detected.

A document manager 270 is provided that is operable to receive save commands and, in response, incorporate edits as concrete changes to the master document 235. The document manager 270 may then signal the provision module 230 to provide the endpoints with an update of the master document 235 to commit the edit as an editable concrete change. A save command may occur, in various aspects, periodically (e.g., an auto-save) when a user initiates a save or merge, or when a new coauthor joins the coauthoring session. In various aspects, the update initiated by the save command is not implemented of the same channel as rumored changes, and does not take place in real-time, but rather affects a merge of the plurality of copies 220, which may include too much data to transmit or implement in real-time. Because merges are not transmitted or implemented in real-time, the document manager 270 is operable to resolve conflicts and devote greater processing power and resources to the effects of an edit. The concrete changes that do not conflict with one another (or whose conflicts are resolved) made by each coauthor are merged into the master document 235. The document manager 270 may then signal the provision module 230 to provide each of the remaining copies in the plurality of copies 220 with the updated master document 235 (or sections thereof) so that each copy is working with an identical, up-to-date version of the master document 235.

Figure 3:
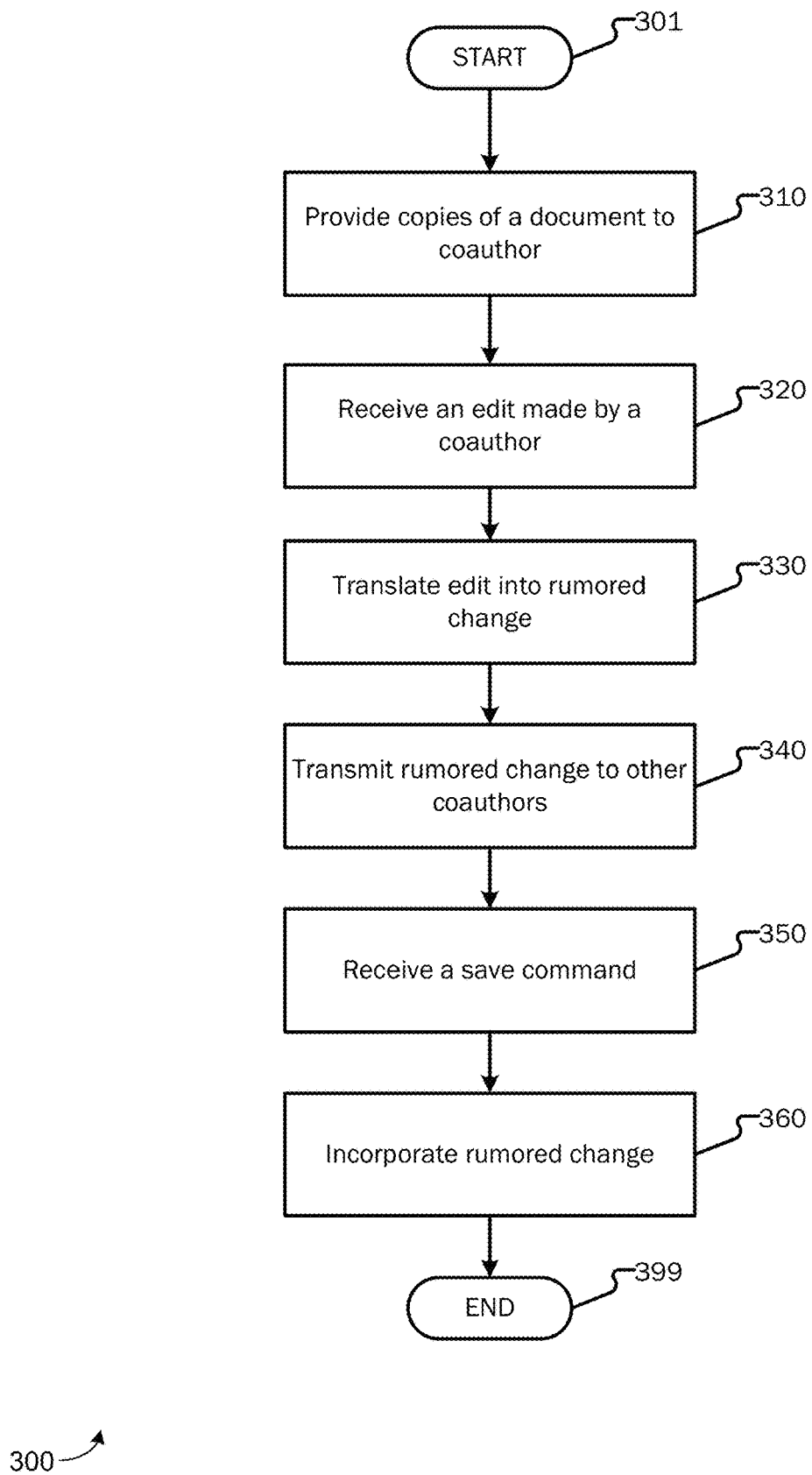
FIG. 3 is a flow chart showing general stages involved in an example method for implementing real-time updates with rumored changes.

FIG. 3 is a flow chart showing general stages involved in an example method 300 for implementing real-time updates with rumored changes. Method 300 begins at START 301 and proceeds to OPERATION 310 where copies of a master document 235 are provided to users to coauthor. In various examples, one or more of the users may be a viewer without write access and at least one of the users will have write access as a coauthor. The copies are originally provided as having identical content and will be periodically merged so that the copies have identical content that incorporates edits made by coauthors.

At OPERATION 320, an edit made by a coauthor is received. In various aspects, the edit may be to add or remove content, which may be text or objects in the copy of the master document 235. The edits may be received in real-time, subject to any transmission delays, so that the edit may be shared to endpoints in real-time.

At OPERATION 330, the received edit is translated into a rumored change for one or more endpoints. In various aspects, the edit may have some of its information omitted during translation to facilitate its sharing in real-time by reducing the amount of information that needs to be transmitted or processed to display the rumored change in real-time. For example, formatting changes (e.g., bold status, typeface, etc.) may be omitted. The translation may also include the addition of information so that the endpoints can determine where and how to display the edit as a rumored change. For example, author information, identifying the source of the edit, or state information, identifying the state of the editor's copy, may be added. The format of the edit may also be translated from the format used by the editor's backing store to a format interpretable by the editors, such as, for example, JSON or XML.

Method 300 then proceeds to OPERATION 340, where the rumored change is transmitted to the other users in the coauthoring session. In various aspects, the rumored change is transmitted to coauthors and viewers over a fast channel so that they can display the rumored change in real-time. Several rumored changes with positional information indicating that the edits are contiguous may be combined into one rumored change by the endpoints. For example, when an editor types the words "hello world" each entry of a character (e.g., "h", "space", "d", etc.) may be considered a separate edit, but could be combined into a unified rumored change of "hello world" because the edits are contiguous.

Rumored changes that are transmitted at OPERATION 340 may also be transmitted to offline users or coauthors that are not participating in real-time updates. The offline users and non-real-time coauthors may have once been coauthors in real-time who have disconnected from the coauthoring session or have experienced transmission errors. Alternatively, these users may have opted out of real-time updates for performance reasons or lack a document editing application supporting real-time updates. These users may receive and ignore the rumored changes and wait for a save command to occur for edits to be shared.

At OPERATION 350 a save command is received from an editor, initiating an update of the master document 235 to include any edits made since the last save command or the master document 235 was first provided. The save command may be performed over a different channel than the real-time updates and may take longer to process than displaying a rumored change. To process the save command, the concrete changes made by an editor, a section affected by a concrete change, or the entire copy of the master document 235 may need to be processed and incorporated into the other copies. In various aspects, processing the save command may include comparing vector clocks for each of the coauthors so that conflicts may be resolved.

A save command may be received from one or more coauthors or viewers. For example, a viewer may transmit a save command so that any coauthors will transmit their edits for incorporation into the master document 235. A save command will generate a document merge that includes edits made by a coauthor, and may initiate additional save commands to be sent by other coauthors who have made changes.

At OPERATION 360, the rumored changes are incorporated into each of the document copies. Multiple edits from multiple coauthors may be received as part of the save command and incorporated into the master document 235, which in turn is provided to the coauthors and viewers participating in the coauthoring session. The rumored changes that correspond to concrete changes now part of the master document 235 are removed from display. The coauthors may update their document copies in a foreground thread, which may introduce brief hangs or periods of unresponsiveness as sections of the copy are updated, or in a background thread, which may take longer to fully implement than in a foreground thread.

In some aspects, where indicators 170 are used to indicate a rumored change as in FIGS. 1B-E and 1G-H, the indicator 170 may persist after the rumored change has been incorporated as the corresponding concrete change. While an indicator 170 is persisted, an endpoint may be prevented from manipulating the concrete change, or an endpoint may interact with only those portions of the indicated content that are concrete changes.

When coauthors do not transmit their edits in response to a save command, or their edits take too long (i.e., exceed a time threshold) to be incorporated into the master document 235, either due to transmission delays or processing delays, their edits may remain as rumored changes on the endpoints until the next save command occurs. These edits may be incorporated into the master document 235 in anticipation for the next save command.

Method 300 may conclude at END 399.

Figure 4:
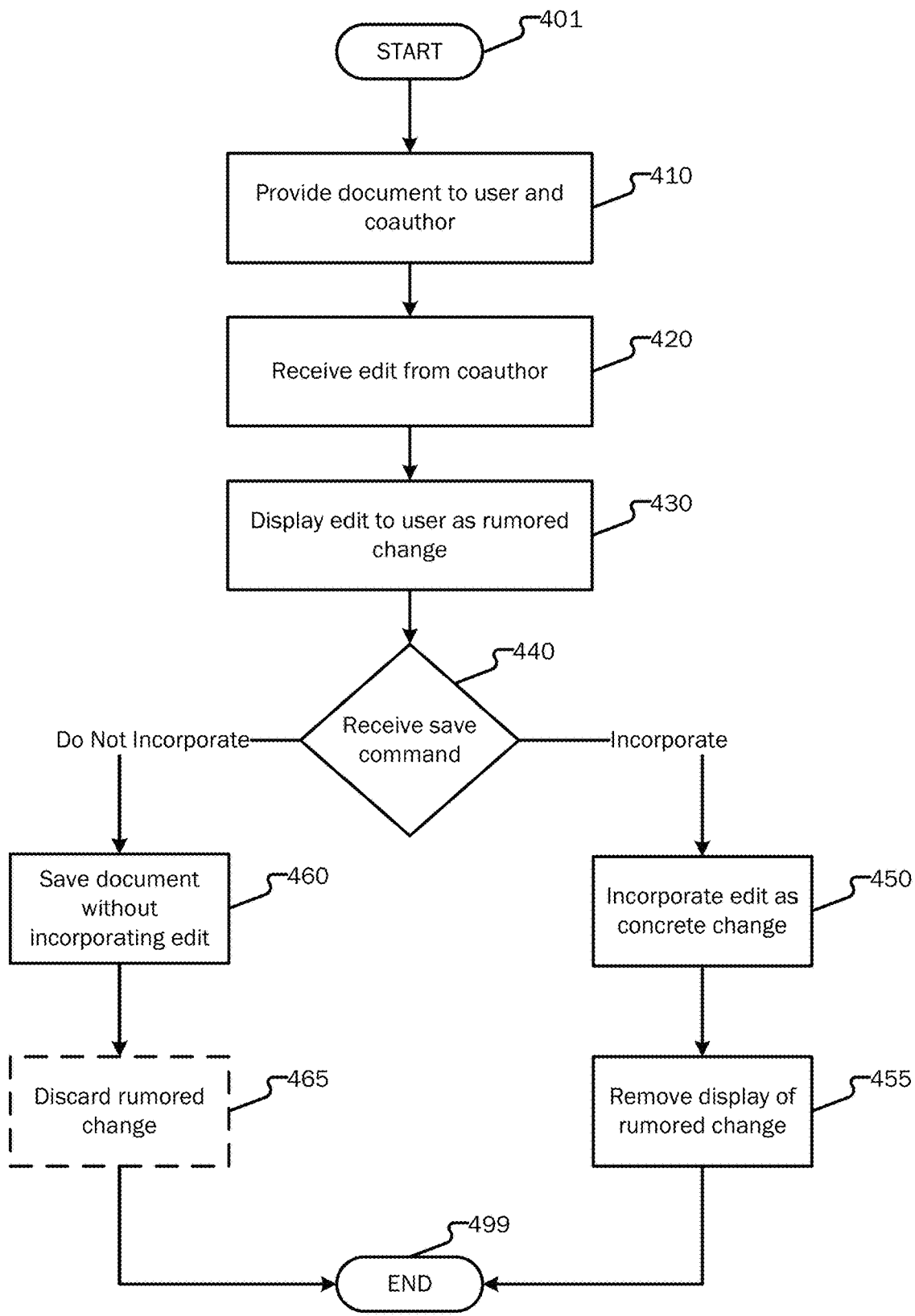
FIG. 4 is a flow chart showing general stages involved in an example method for using rumored changes for real-time coauthoring.

FIG. 4 is a flow chart showing general stages involved in an example method 400 for using rumored changes for real-time coauthoring. Method 400 begins at START 401 and proceeds to operation 410, where a document being coauthored is provided to a user of an endpoint and a coauthor on an editor. In various aspects the user may be a full coauthor, having read and write permissions, or a viewer, who has read permissions, but not write permissions. In various aspects, the document 120 may be a word processing file, a presentation file, a spreadsheet file, a notes file, or other file capable of being authored by multiple users in real-time. Although method 400 is discussed relative to one endpoint user and one editor coauthor, it will be understood that more endpoints and editors are capable of using the present disclosure, and that a given computing device or application may be both an editor and an endpoint.

At OPERATION 420 an edit is received from the coauthor. In various aspects, the edit may be to add text, remove text, replace text, or manipulate an object or a section in a document 120, or combinations thereof. For example, the coauthor may have created a new section in the document 120 of a paragraph and begun typing in that section. The edit will be incorporated into the coauthor's copy as a concrete change at the time the coauthor makes the edit, and will be transmitted to another coauthor for display as a rumored change.

The transmitted edit, in various aspects, may include additional information to identify the coauthor and the state of the coauthor's copy, so that the edit can be properly displayed to the user. The transmitted edit may also be pared down and formatted to facilitate the user receiving and processing the edit for display in real-time. For example, an edit to text may omit typeface, font size, color, and format edits to reduce the size or complexity when processing or displaying the edit.

At OPERATION 430 the edit is displayed to the user as a rumored change. The edit may be transmitted over a fast channel to the endpoint so that the rumored change may be displayed in real-time, so that the user of the endpoint sees the edit as though it were made locally. When displaying the edit as a rumored change in real-time, the endpoint will display its interpretation of the edit and may display an indicator 170 as in FIGS. 1B-E and 1G-H to identify what content is included in the rumored change and which coauthor the rumored change is associated with. In some aspects, an indicator 170 may only be displayed when a user on an endpoint attempts to select the rumored change, otherwise the rumored change may be displayed seamlessly in the document with nothing to indicate that it is different from the other content.

A rumored change is not necessarily a WYSIWYG preview of the concrete change it corresponds to, but rather a best effort to display the edit in real-time to the user of an endpoint. The best effort of the endpoint may imperfectly reflect the edit, due to some information about the content being purposefully omitted, delays and errors in transmission, or errors in interpretation. Because the rumored change is a best effort and may imperfectly reflect the edit, or may be subject to additional edits still being transmitted or processed, the user of an endpoint may be prevented from selecting or modifying the rumored change until it is a concrete change on the endpoint. By relaxing the requirements that the rumored change not be a WYSIWYG preview, fewer error correction schema need to be applied to the transmitted edit, thus reducing network overhead and the need for processing resources on endpoints for real-time implementation of edits.

At BRANCH OPERATION 440 a save command is received. If the save command indicates that the edit should be incorporated, method 400 proceeds to OPERATION 450. If the save command indicates that the edit should not be incorporated, however, method 400 proceeds to OPERATION 460. A save command, in various aspects, may occur at a selected interval (e.g., during a scheduled auto-save), at the selection of a save functionality (e.g., a save icon, a share button, etc.), or when another action is performed that results in merge of the copies of the document. Either the user or the coauthor may send the save command and indicate whether the edit should be incorporated.

At OPERATION 450, the edit is incorporated as a concrete change on the endpoint. The edit may already be a concrete change on the coauthor's copy when it is merged into a master copy for distribution to the user in response to the save command. In various aspects, the save command initiates a transmission of the edit and associated information over a different channel than the channel used to transmit rumored changes. The edit may be merged into a master copy and then transmitted to the user or transmitted directly to the user for incorporation into the backing store of the user's copy. The merge that the save command initiates may be achieved in non-real-time as the merge may take significant time to process compared to a real-time update, and the edits may appear in the user's copy as concrete changes when processing is complete.

Method 400 then proceeds to operation 455, where the display of the rumored change is removed. Because the concrete change that corresponds to the rumored change correctly displays the edit, and the editing process has already been communicated in real-time to the endpoint, there is no longer a need to display by edit as a rumored change, and the corresponding concrete change replaces the rumored change on the endpoint. In some aspects, where an indicator 170 indicates which edits have been made by a given coauthor, the indicator 170 may be persisted on the concrete change for a period of time. The indicator 170, when no longer persisted, may be removed suddenly or gradually, such as, for example, fading into the style of the document 120 being coauthored. Method 400 may then conclude at END 499.

At OPERATION 460, the document 120 is saved without incorporating the edit that is displayed as a rumored change. The rumored change may not be incorporated, for example, when one coauthoring participant chooses to create a separate branch of the document 120, or when it is determined that a coauthor has not completed an edit when a save command is received and the edit should therefore remain a rumored change on endpoints. When an edit remains a rumored change, it may become a concrete change in response to a subsequent save command. Method 400 may conclude at END 499 if the rumored change is to be retained until the next save command, or method 400 may proceed to OPTIONAL OPERATION 465.

Method 400 may proceed to OPTIONAL OPERATION 465 to discard a rumored change in response to a save command. When rumored change is discarded, a branch of the document is saved, which may be a new version of the document or a new document. Any users accessing different branches will not be coauthors; they are accessing different documents. Any users, whether reading the document 120 or making edits when a branch is made may be prompted whether to continue their edits on a given branch.

In various examples, because the rumored change is not yet part of the user's copy of the document 120, a save command from the user may result in the document 120 discarding the rumored change. For example, a user may use a local save functionality or a save-as functionality to create a branch of the document 120 that does not include the edit represented by the rumored change. Similarly, the coauthor may create a private branch (i.e., one that is not coauthored) by using a save-as functionality, which may result in the rumored change being discarded from the endpoints.

When OPTIONAL OPERATION 465 is not executed, the edit that was not incorporated into the document at OPERATION 460 may be persisted or re-displayed as a rumored change. When it is detected that the rumored change is to be persisted, for example, when a user's local settings dictate it, the edit will not be incorporated, but the rumored change will be displayed in the local copy.

Method 400 may then conclude at END 499.

While the present disclosure has been described in the general context of program modules that execute in conjunction with an application program that runs on an operating system on a computer, those skilled in the art will recognize that examples and aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

FIGS. 5-8 and the associated descriptions provide a discussion of a variety of operating environments in which examples may be practiced. However, the devices and systems illustrated and discussed with respect to FIGS. 5-8 are for purposes of example and illustration and are not limiting of a vast number of computing device configurations that may be utilized for practicing aspects of the present disclosure.

Figure 5:
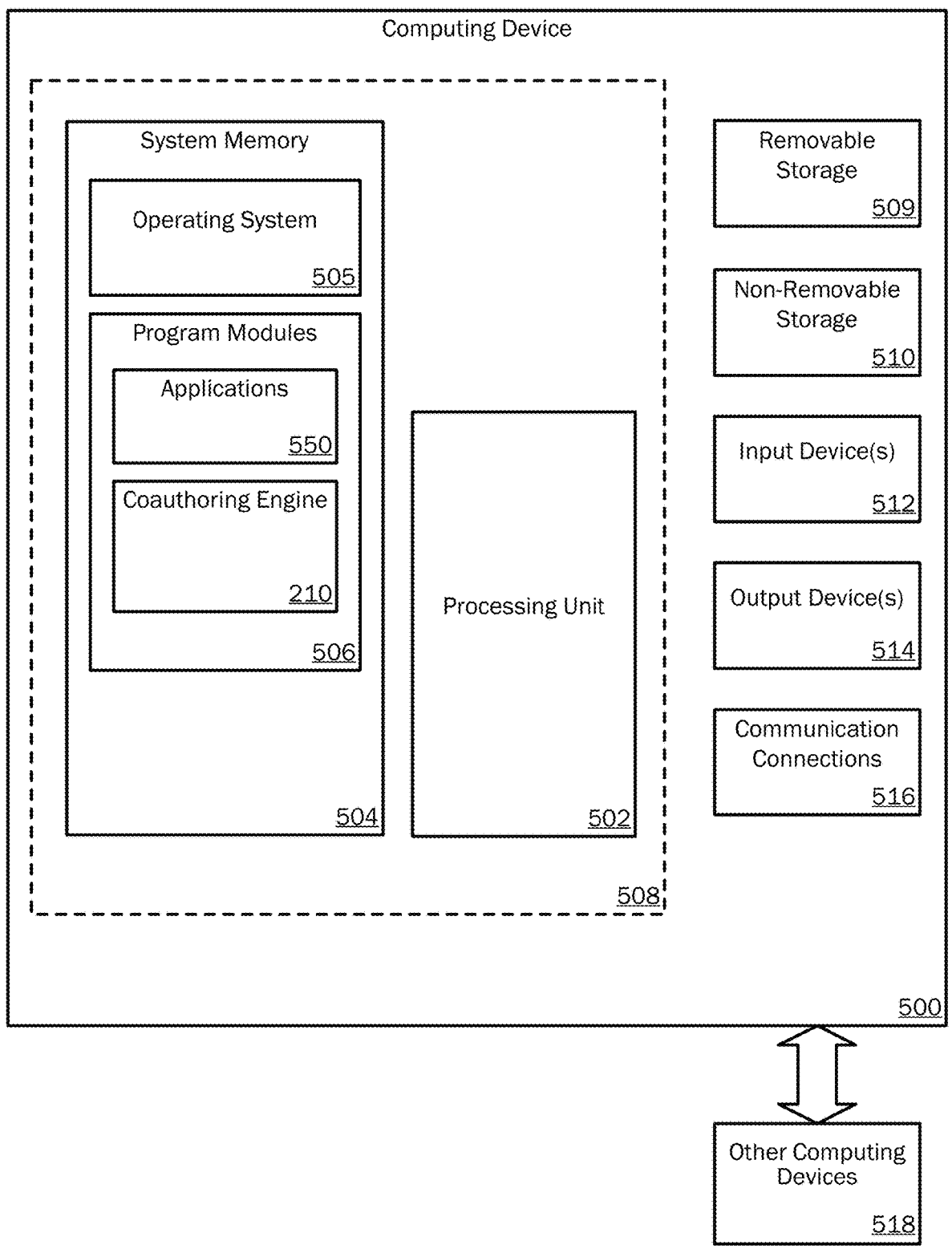
FIG. 5 is a block diagram illustrating physical components of a computing device with which examples may be practiced.

FIG. 5 is a block diagram illustrating physical components (i.e., hardware) of a computing device 500 with which examples may be practiced. The computing device components described below may be suitable for the computing devices 110 described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550, such as editors and endpoints. According to an aspect, the system memory 504 may include the coauthoring engine 210. The operating system 505, for example, may be suitable for controlling the operation of the computing device 500. Furthermore, aspects may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., editors, endpoints, coauthoring engine 210) may perform processes including, but not limited to, one or more of the stages of the methods 300 and 400 illustrated in FIGS. 3 and 4. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples may be practiced in an electrical circuit comprising discrete electronic elements, packaged or integrated electronic chips containing logic gates, a circuit utilizing a microprocessor, or on a single chip containing electronic elements or microprocessors. For example, examples may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
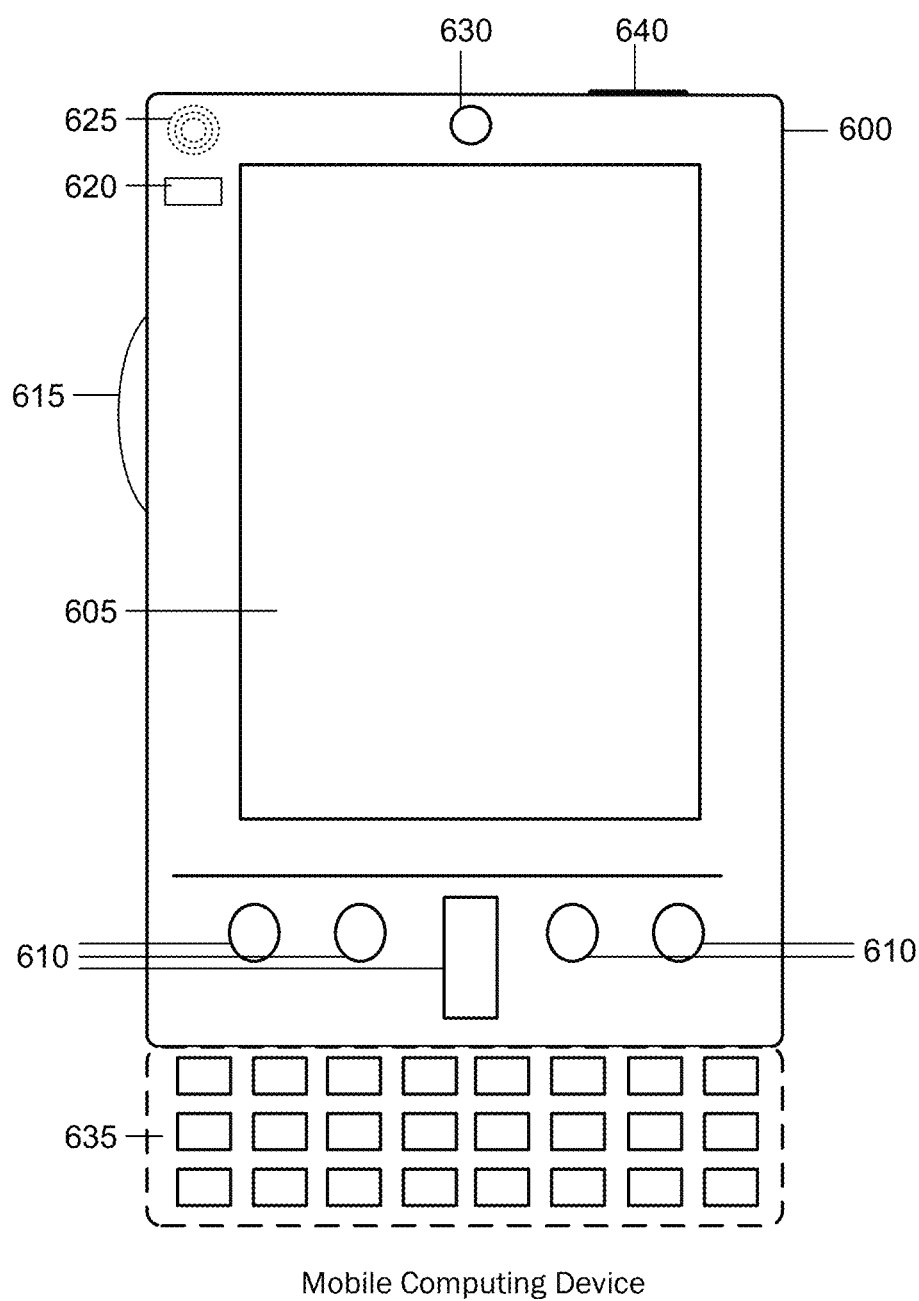
FIGS. 6A and 6B are block diagrams of a mobile computing device with which aspects may be practiced.
Figure 6B:
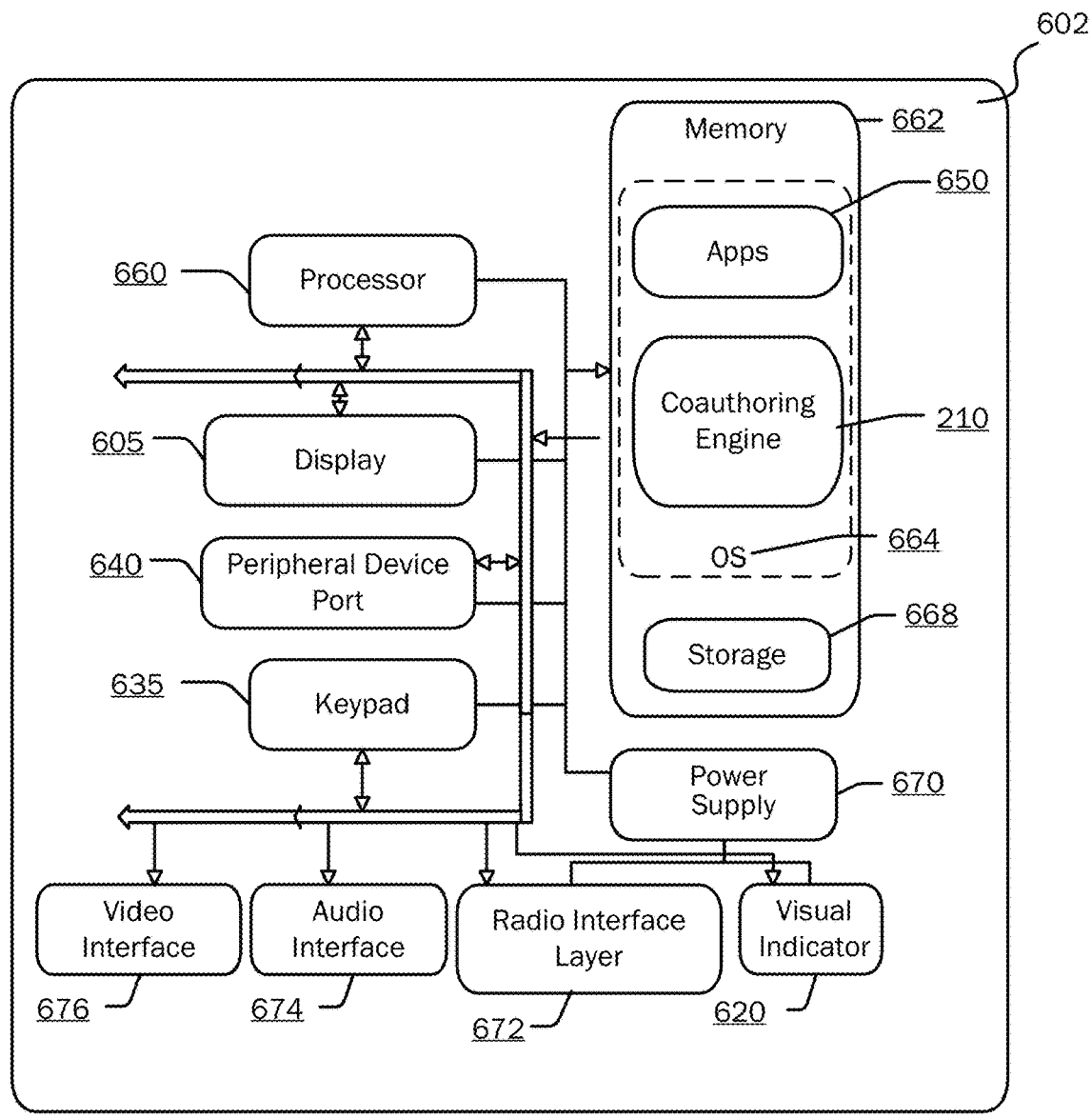

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), or an audio transducer 625 (e.g., a speaker). In some examples, the mobile computing device 600 incorporates a vibration transducer for providing the user with tactile feedback. In yet another example, the mobile computing device 600 incorporates peripheral device ports 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650, for example, editors and endpoints, may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the coauthoring engine 210 may be loaded into memory 662. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

The visual indicator 620 may be used to provide visual notifications or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
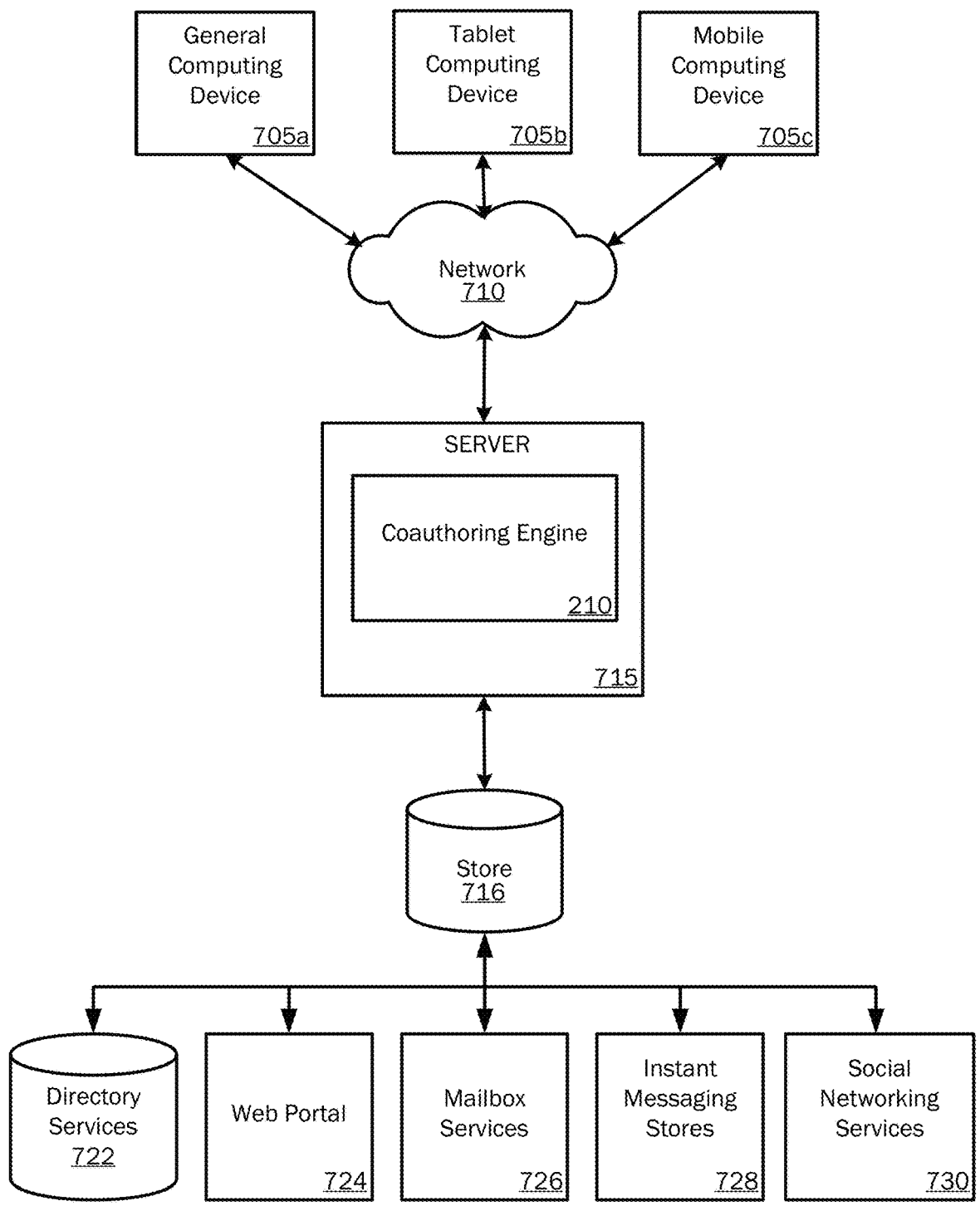
FIG. 7 is a block diagram of a distributed computing system in which aspects may be practiced.

FIG. 7 illustrates one example of the architecture of a system for providing data visualization as described above. Content developed, interacted with, or edited in association with editors, endpoints, or the coauthoring engine 210 may be stored in different communication channels or other storage types. For example, various documents may be stored using a directory service 722, a web portal 724, a mailbox service 726, an instant messaging store 728, or a social networking site 730. The editors, endpoints, or the coauthoring engine 210 may use any of these types of systems or the like for providing data visualization, as described herein. A server 715 may provide editors, endpoints, or the coauthoring engine 210 to clients 705A-C. As one example, the server 715 may be a web server providing the editors, endpoints, or the coauthoring engine 210 over the web. The server 715 may provide the editors, endpoints, or the coauthoring engine 210 over the web to clients 705 through a network 710. By way of example, the client computing device may be implemented and embodied in a personal computer 705A, a tablet computing device 705B or a mobile computing device 705C (e.g., a smart phone), or other computing device. Any of these examples of the client computing device may obtain content from the store 716.

Aspects of the present disclosure, for example, are described above with reference to block diagrams or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the present disclosure as claimed in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A system for coauthoring documents, comprising:
a processor; and
a memory, having instructions which when executed by the processor cause the system to:
provide a document to a plurality of coauthors, wherein a corresponding copy of the document is created for each of the coauthors to generate a plurality of copies of the document;
detect one or more edits made by a first coauthor, from the plurality of coauthors, to a first copy of the document, from the plurality of copies of the document;
determine, based on the complexity of the one or more edits, whether the one or more edits should be transmitted in real-time or non-real-time;
when it is determined that the one or more edits should be transmitted in real-time:
translate the one or more edits in the first copy of the document as one or more non-editable rumored changes, the one or more non-editable rumored changes omitting style modifications made in the first copy of the document;
transmit the one or more non-editable rumored changes as a real-time update to a remainder of the plurality of copies of the document; and
display the transmitted one or more non-editable rumored changes within one or more of the remainder of the plurality of copies of the document; and
when it is determined that the one or more edits should be transmitted in non-real-time:
execute a save operation on the first copy of the document after the occurrence of the one or more edits; and
based on the save operation executed on the first copy of the document:
translate the one or more edits in the first copy of the document into one or more editable concrete changes;
transmit the one or more editable concrete changes as a non-real-time update to the remainder of the plurality of copies of the document; and
replace the one or more non-editable rumored changes within the remainder of the copies of the document with the one or more editable concrete changes by merging the one or more editable concrete changes into the remainder of the copies of the documents.

2. The system of claim 1, wherein the system is further operable to omit formatting information from the one or more edits when translating the one or more edits into one or more rumored changes.

3. The system of claim 1, wherein the first coauthor is a host of the document.

4. The system of claim 1, wherein display of the non-editable rumored changes does not affect the editability of other content in the one or more remainder of the plurality of copies.

5. A method for coauthoring documents, comprising:
displaying a first copy of an electronic document accessible in a coauthoring environment on a first computing device associated with a first user;

receiving an edit made on the first copy of the electronic document, wherein the edit is incorporated in the first copy of the electronic document;

determining, based on the complexity of the one or more edits, whether the one or more edits should be transmitted in real-time or non-real-time;

when it is determined that the one or more edits should be transmitted in real-time:

transmitting in real-time the edit made to the first copy of the electronic document as a non-editable rumored change to a second computing device coauthoring a second copy of the electronic document, the non-editable rumored change omitting style modifications made on the first copy of the document; and displaying within the second copy of the electronic document the non-editable rumored change; and when it is determined that the one or more edits should be transmitted in non-real-time:

executing a save operation a the first computing device, after occurrence of the edit, to save the first copy of the document; and based on execution of the save command on the first copy of the document:

translating the edit in the first copy of the electronic document into an editable concrete change;

transmitting in non-real time the editable concrete change to the second computing device; and replacing the non-editable rumored change within the second copy of the electronic document with the editable concrete change by merging the editable concrete change into the second copy of the electronic document.

6. The method of claim 5, wherein transmitting the edit as a non-editable rumored change to the second computing device further comprises omitting formatting from the edit.

7. The method of claim 5, wherein the electronic document is at least one of:

a word processing file;
a notes file;
a spreadsheet file; and
a presentation file.

8. The method of claim 5, wherein the non-editable rumored change transmitted in real-time to the second computing device is transmitted across a first channel, and wherein the concrete change transmitted to the second computing device in non-real time is transmitted across a second channel at a speed less than a speed used in the first channel.

9. The method of claim 5, wherein the rumored change comprises several contiguous edits.

10. The method of claim 5, wherein the rumored change is displayed in a style associated with the first user and wherein the style includes at least one of the following elements:

a text color;
a highlight;
a typeface;
a text format
a font size; and
a border.

11. The method of claim 10, wherein the edit is deletion of a text, and wherein the style associated with the first user further includes at least one of:

a strikethrough format;
a ghosting format; and
not displaying the text deleted.

12. The method of claim 10, wherein the style associated with the first user is faded out when the concrete change replaces the rumored change in the second copy of the document.

13. The method of claim 5, wherein the save operation is executed in response to a third user beginning to coauthor the document.

* * * * *